United States Patent
Takahashi et al.

(10) Patent No.: US 9,477,058 B2
(45) Date of Patent: Oct. 25, 2016

(54) HOUSING CASE FOR OPTICAL FIBER

(71) Applicant: FUJIKURA, LTD., Koto-ku, Tokyo (JP)

(72) Inventors: Yuu Takahashi, Sakura (JP); Susumu Okabe, Sakura (JP); Sawako Yamai, Sakura (JP)

(73) Assignee: FUJIKURA, LTD., Tokyo (JP)

( * ) Notice: Subject to any disclaimer, the term of this patent is extended or adjusted under 35 U.S.C. 154(b) by 111 days.

(21) Appl. No.: 14/528,282

(22) Filed: Oct. 30, 2014

(65) Prior Publication Data
US 2016/0124171 A1    May 5, 2016

(51) Int. Cl.
G02B 6/00 (2006.01)
G02B 6/44 (2006.01)
G02B 6/36 (2006.01)

(52) U.S. Cl.
CPC .................... G02B 6/4457 (2013.01)

(58) Field of Classification Search
CPC ............. B01D 1/00; B01D 3/02; F17C 2/20; F17C 2/22; G02B 6/00; G02B 6/36
USPC .......................... 385/134–139, 147
See application file for complete search history.

(56) References Cited

U.S. PATENT DOCUMENTS

| | | | | |
|---|---|---|---|---|
| 4,322,942 A * | 4/1982 | Fajt | ........................... | D01H 4/00 57/333 |
| 5,640,835 A * | 6/1997 | Muscoplat | .............. | B31B 41/00 101/248 |
| 5,703,990 A * | 12/1997 | Robertson | ........... | H01S 3/06704 359/341.1 |
| 6,484,958 B1 * | 11/2002 | Xue | .................... | B65H 75/4434 242/378.1 |
| 6,650,821 B1 * | 11/2003 | Koyano | ............... | G02B 6/4457 385/11 |
| 7,325,983 B1 * | 2/2008 | Dallesasse | ........... | G02B 6/4201 385/1 |

FOREIGN PATENT DOCUMENTS

| | | |
|---|---|---|
| JP | 62-96603 U | 6/1987 |
| JP | 63-160503 U | 10/1988 |
| JP | 5-203816 A | 8/1993 |
| JP | 2001-122336 A | 5/2001 |
| JP | 2009-51512 A | 3/2009 |
| JP | 2014-129138 A | 7/2014 |

OTHER PUBLICATIONS

Notification of Reasons for Rejections for Japanese Patent Application No. 2013-154609, dated Aug. 26, 2014.
Written Explanation of Circumstances Concerning Accelerated Examination for Japanese Patent Application No. 2013-154609.

* cited by examiner

*Primary Examiner* — Akm Enayet Ullah
(74) *Attorney, Agent, or Firm* — Sughrue Mion, PLLC

(57) ABSTRACT

Technical Problem In the case where an optical fiber is wound around several times and housed, it is difficult to take out a terminal end of the optical fiber at a side wound around before.
Solution to Problem A housing case includes: a body; and bobbin around which an optical fiber is to be wound, the bobbin being housed rotatably in the body, bobbin having a partition portion, partition portion having a fiber groove that guides the optical fiber between an inside and an outside of the partition portion, and the optical fiber being housed by housing a one end side of the optical fiber in the inside of the partition portion and by winding around an outer wall surface of the partition portion the optical fiber that has been guided to the outside of the partition portion with the fiber groove.

7 Claims, 30 Drawing Sheets

FIRST EMBODIMENT

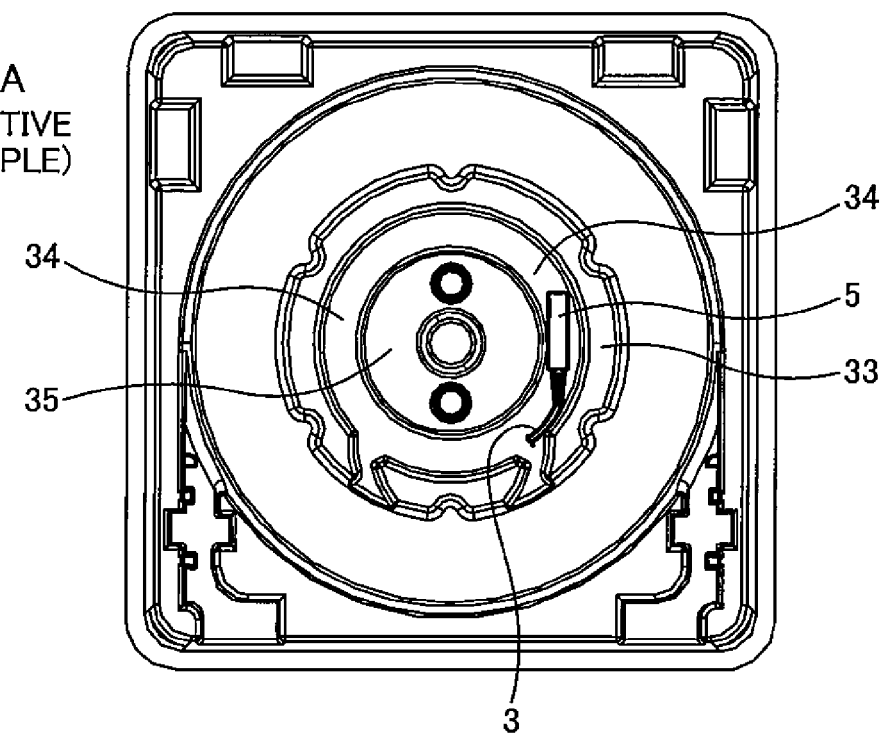
FIG. 12A (COMPARATIVE EXAMPLE)
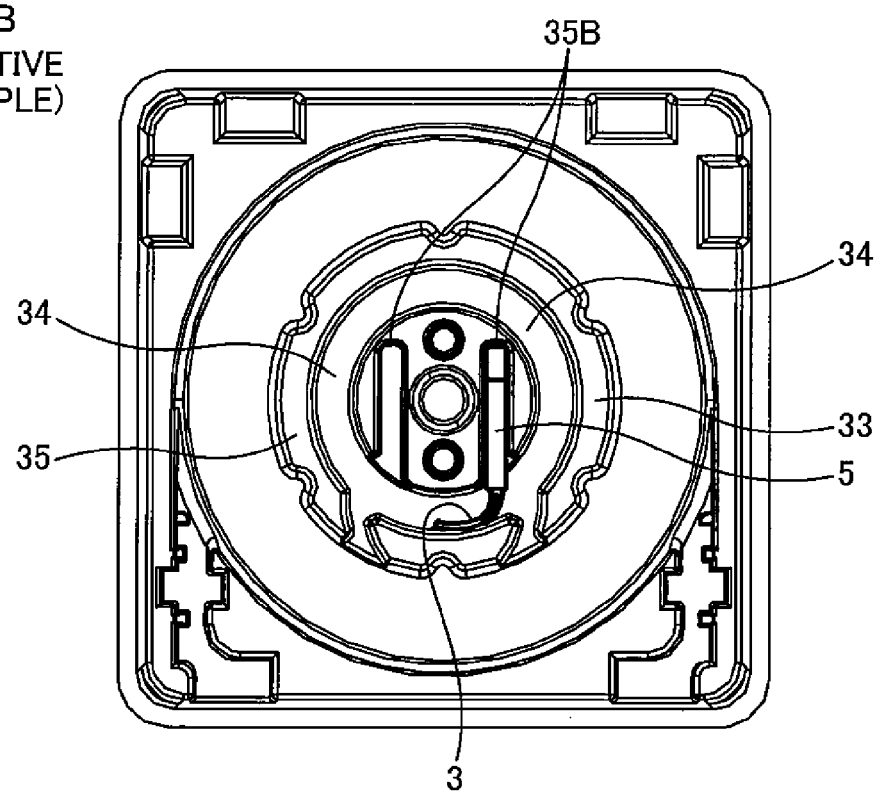
FIG. 12B (COMPARATIVE EXAMPLE)

(FIRST
EMBODIMENT)

(COMPARATIVE
EXAMPLE)

HOUSING CASE FOR OPTICAL FIBER

TECHNICAL FIELD

The present invention relates to housing cases for optical fibers.

RELATED ART

As housing cases that house optical fibers, there are known, for example, cases disclosed in patent literatures 1 to 3.

In patent literature 1, there is described a housing device (housing case) having a supporting plate that supports and houses cords and a rotating disk that rotates with respect to the supporting plate. In patent literature 1, the cord is wound around and housed in a peripheral portion of the rotating disk.

In patent literature 2, there are included an inner case and an outer case, and the outer case is formed with a circular round groove. In patent literature 2, the optical fiber is wound around the circular round groove of the outer case and housed therein.

In patent literature 3, there is disclosed a case packaging optical fibers and optical switches. In patent literature 3, a rotatable columnar member is rotated, and the optical switches with the optical fibers having different lengths can be housed.

CITATION LIST

Patent Literature

PTL1 Patent Application Laid-open Publication No. 05-203816
PTL2 Patent Application Laid-open Publication No. 2001-122336
PTL3 Patent Application Laid-open Publication No. 2009-051512

SUMMARY OF INVENTION

Technical Problem

In the case where the optical fiber is wound around several times and housed, it becomes difficult to take out a terminal end of the optical fiber at a side that has been wound before.

Solution to Problem

An advantage of some aspects of the present invention is that it is possible to provide a housing case in which, even in the case where an optical fiber has been wound around several times and housed, a terminal end of the optical fiber at a side that has been wound around first can be taken out.

An aspect of the invention is a housing case including:
a body; and
a bobbin around which an optical fiber is to be wound, the bobbin being housed rotatably in the body,
the bobbin having a partition portion,
the partition portion having a fiber groove that guides the optical fiber between an inside and an outside of the partition portion, and
the optical fiber being housed by housing a one end side of the optical fiber in the inside of the partition portion and by winding around an outer wall surface of the partition portion the optical fiber that has been guided to the outside of the partition portion with the fiber groove.

Other features of the present invention will be made clear through the present specification with reference to the accompanying drawings.

Advantageous Effects of Invention

According to this invention, even in the case where the optical fiber has been wound around several times and housed, the terminal end of the optical fiber at the side that has been wound around before can be taken out.

BRIEF DESCRIPTION OF THE DRAWINGS

FIG. 12A is a comparative view in which the connector 5 is housed in the inner groove portion 34, without the connector fixing portion 35B being provided. FIG. 12B is a comparative view in which the connector 5 is housed in only the connector fixing portions 35B, without providing the connector end fixing portion 33D.

FIG. 28A is a perspective view of the bobbin 30 with an upper flange member 40 removed seen from above right. FIG. 28B is a perspective view of the bobbin 30 seen from below right. FIG. 28C is a side view of the bobbin 30 seen from the right.

DESCRIPTION OF EMBODIMENTS

Figure 1A:
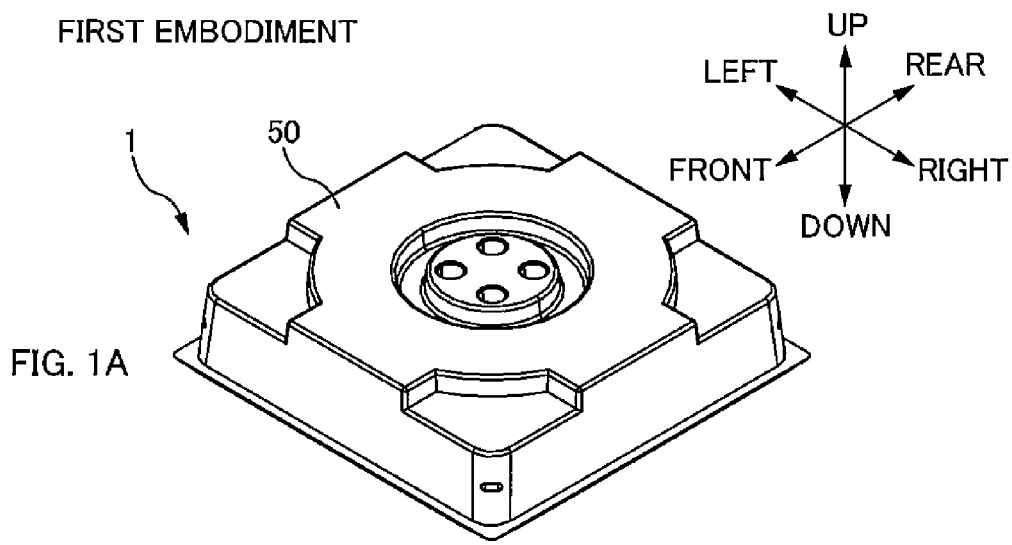
FIG. 1A is an overall perspective view of a housing case 1.

At least the following matters will become clear through the description of the present specification and the accompanying drawings.

A housing case will become clear including:

a body; and a bobbin around which an optical fiber is to be wound, the bobbin being housed rotatably in the body, the bobbin having a partition portion, the partition portion having a fiber groove that guides the optical fiber between an inside and an outside of the partition portion, and the optical fiber being housed by housing a one end side of the optical fiber in the inside of the partition portion and by winding around an outer wall surface of the partition portion the optical fiber that has been guided to the outside of the partition portion with the fiber groove.

According to such a housing case, even in a state in which the optical fiber is wound around the outer wall surface of the partition portion, the optical fiber housed in the inside of the partition portion can be pulled out.

It is preferable that an annular inner groove portion is formed in the inside of the partition portion. As a result of this, the optical fiber can be wound around and housed in the annular inner groove portion, thus the optical fiber can be housed efficiently in a small space.

It is preferable that a protrusion portion is formed in an inside of the inner groove portion, and the protrusion portion has a connector fixing portion that fixes a connector provided to the one end side of the optical fiber. As a result of this, the connector provided to a terminal end of the optical fiber housed in the inner groove portion can be fixed.

It is preferable that the partition portion has a connector end fixing portion that fixes an end portion of the connector. As a result of this, even when the size of the connector becomes long, the radius of curvature of the optical fiber that extends out from the connector can be satisfactorily secured.

It is preferable that the connector end fixing portion and the connector fixing portion are formed shallower than the inner groove portion. As a result of this, when the connector is fixed in the connector end fixing portion and the connector fixing portion, it becomes difficult for the optical fiber housed in the inner groove portion to come off.

It is preferable that there are further included an upper lid to cover the body, the bobbin, and the optical fiber wound around the bobbin, the upper lid having an annular projection formed opposing the inner groove portion, and the annular projection being arranged to an upper side of the connector. As a result of this, it becomes difficult for the connector to come off, regardless of the rotation position of the bobbin inside the housing case.

It is preferable that the partition portion has two fiber grooves, the one end side of the optical fiber is housed in the inside of the partition portion, and the optical fiber is guided to the outside of the partition portion with one of the fiber grooves, and another end side of the optical fiber is guided to the inside of the partition portion with another fiber groove, and the optical fiber is housed in the inside of the partition portion. As a result of this, both end sides of the optical fiber can be housed in the inside of the partition portion.

First Embodiment

Configuration of Housing Case

Figure 1B:
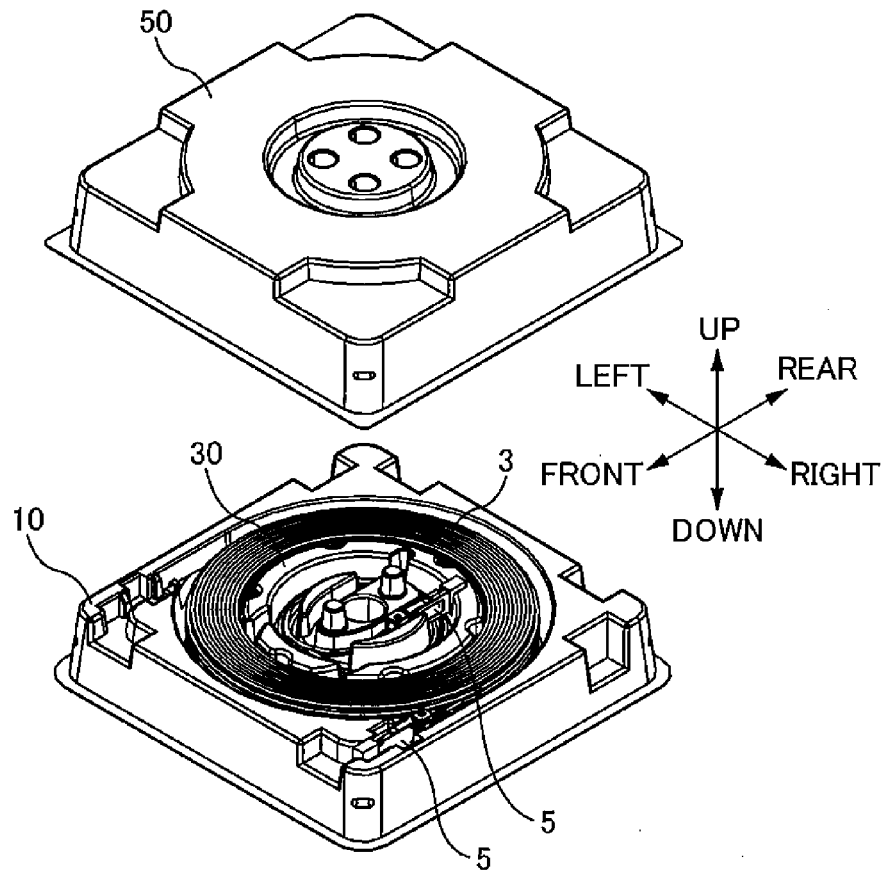
FIG. 1B is a perspective view of the manner when an upper lid 50 of the housing case 1 has been opened.
Figure 2:
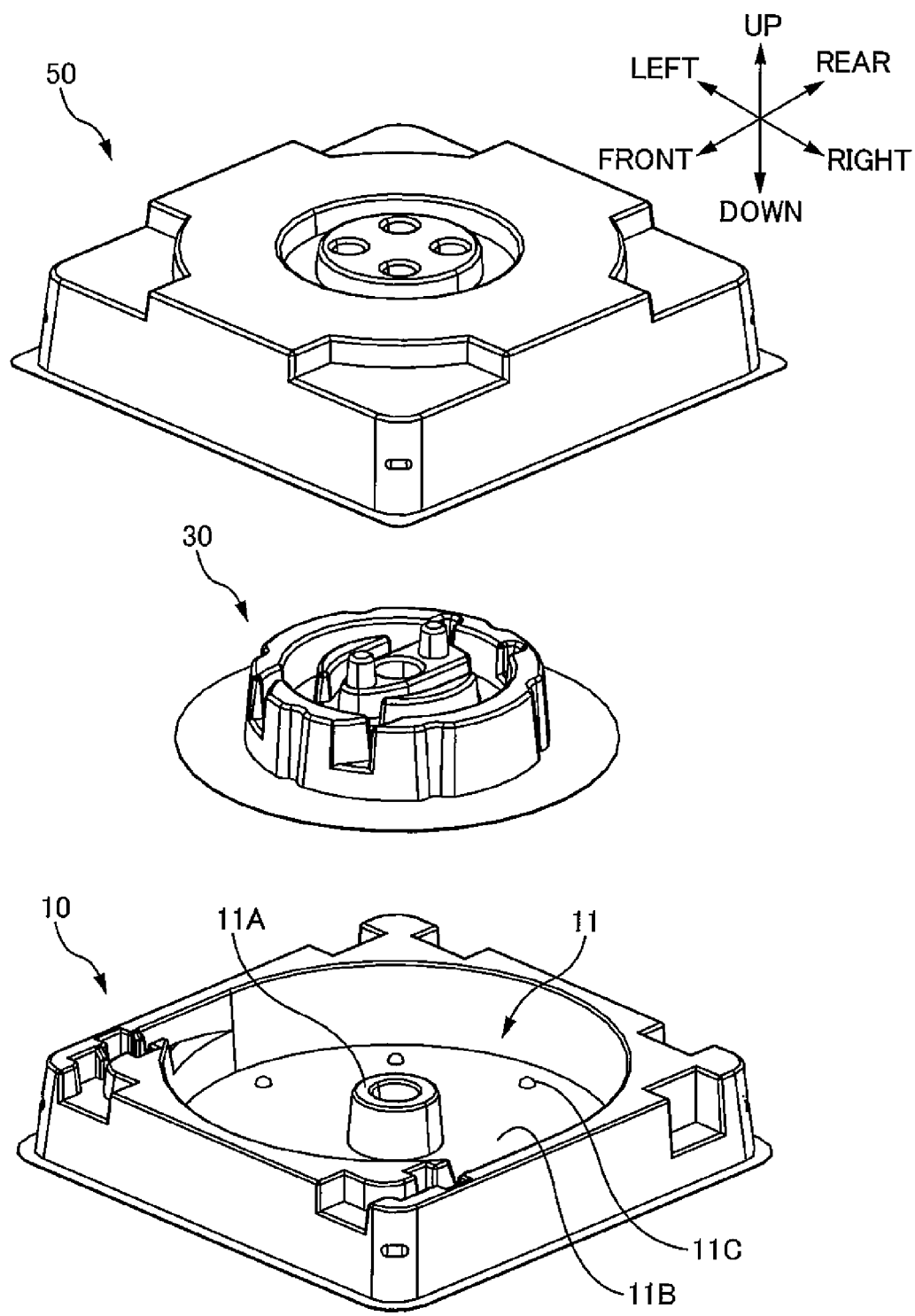
FIG. 2 is an exploded perspective view of the housing case 1.

FIG. 1A is an overall perspective view of a housing case 1. FIG. 1B is a perspective view of a manner in which an upper lid 50 of the housing case 1 has been opened. FIG. 2 is an exploded perspective view of the housing case 1.

In the below explanation, as shown, each direction is defined. In other words, a direction perpendicular to a placement surface to which the housing case 1 has been placed is referred to as an "up-down direction", and the side of the upper lid 50 is referred to as "up", and the body 10 side is referred to as "down". In other words, when the body 10 is a reference, the upper lid 50 side is "up", and the opposite side is "down". Further, the direction of an optical fiber 3 when drawing out the optical fiber 3 from the housing case 1 is referred to as a "front-rear direction", and the side of drawing out the optical fiber 3 is referred to as "front", and the opposite side is referred to as "rear". Further, a direction perpendicular to the up-down direction and the front-rear direction is referred to as a "left-right direction", and "right" and "left" are defined according to the direction seen from the front.

The housing case 1 is a case for housing the optical fiber 3. A terminal end of the optical fiber 3 is provided with a connector 5 (an optical module) integrated with a photoelectric conversion element (a light emitting element or a light receiving element). But, a connector without a photoelectric conversion element may be provided. Further, the connector 5 may be provided in only one terminal end of the optical fiber 3, or the connector 5 does not have to be provided to any terminal end. Here, the length of the optical fiber 3 is assumed to be several tens of meters to approximately a hundred meters. The optical fiber is not limited to this length however, and the optical fiber may be longer or shorter than the above length.

The housing case 1 includes the body 10, a bobbin 30, and the upper lid 50. The bobbin 30 is rotatable with respect to the body 10, and thus while rotating the bobbin 30, the optical fiber 3 can be wound around the bobbin 30, and the optical fiber 3 can be pulled out from the bobbin 30. Further, the upper lid 50 is covered from above the body 10 and the bobbin 30, and the optical fiber 3 is protected from dust and the like.

Each component (the body 10, the bobbin 30, the upper lid 50) configuring the housing case 1 is formed dissymmetrically. Thus, when the optical fiber 3 is wound around the bobbin 30, the optical fiber can be wound around from either direction (clockwise or anticlockwise when seen from above).

Each component (the body 10, the bobbin 30, the upper lid 50) configuring the housing case 1 is integrally formed (vacuum formed) with plastic. Here, PET (polyethylene terephthalate) is adopted as the material, and other materials such as PC (polycarbonate), PVC (polyvinyl chloride), transparent PS (polystyrene), colored PS (polystyrene), and PP (polypropylene) can be used. In the case that the housing case 1 is configured with a transparent material, the inside can be confirmed from the outside and thus is convenient.

The body 10 and the upper lid 50 of the housing case 1 are quadrangle when seen from above. Thus, multiple housing cases 1 can be arranged without any spacing in the horizontal direction (front-rear direction or left-right direction), and storage space of the housing case 1 can be kept small. Further, since the body 10 and the upper lid 50 are quadrangle when seen from above, when the upper lid 50 is covered on the body 10, the upper lid 50 is less prone to slipping out of place with respect to the body 10, thus the upper lid 50 is stable.

Body 10

Figure 3:
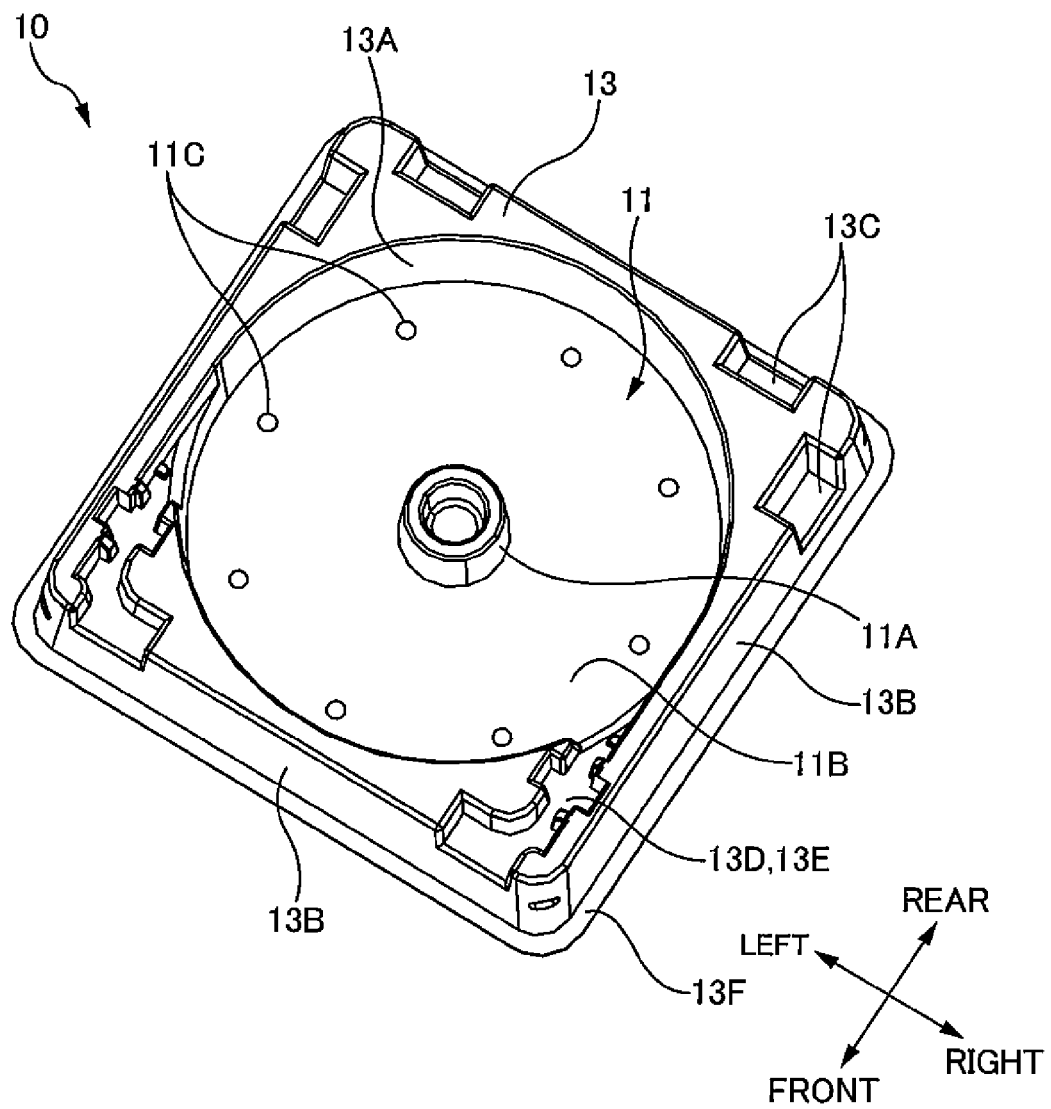
FIG. 3 is a perspective view of the body 10.

FIG. 3 is a perspective view of the body 10. The body 10 is a member to be the base of the housing case 1 and is a member that rotatably houses the bobbin 30. The body 10 has a bobbin housing portion 11 and an edge portion 13.

The bobbin housing portion 11 is a section that rotatably houses the bobbin 30 and is a recess formed in the center portion of the body 10.

An shaft supporting portion 11A is formed in the center of the bobbin housing portion 11. The shaft supporting portion 11A is a section that supports a rotation shaft 31 provided below the bobbin 30. The shaft supporting portion 11A is a cylindrical section that projects to the upper side from a bottom surface 11B of the bobbin housing portion 11, and the rotation shaft 31 of the bobbin 30 fits with the cylindrical shaft supporting portion 11A.

The bottom surface 11B of the bobbin housing portion 11 is formed with a plurality of protruded contact points 11C. The protruded contact points 11C are projections to decrease contact area with a bottom surface of the bobbin 30 (in more detail, a bottom surface of a flange portion 32 of the bobbin 30). By decreasing the contact area with the bobbin 30, the rotation of the bobbin 30 becomes smooth. At least three protruded contact points 11C are necessary to support the bobbin 30, but here eight contact points are formed with consideration given to stability.

The edge portion 13 is a section surrounding the bobbin housing portion 11. The inside of the edge portion 13 is formed with a cylindrical inner surface 13A so as to surround the bobbin 30. The outside of the edge portion 13 is formed in all directions with an outer surface 13B. When seen from above, the inner radius surface 13A is circular and the outer surface 13B is rectangular, and there are spaces in the four corners. Thus, reinforcing ribs 13C are formed in the two corners in the rear side, and fiber passage grooves 13D are formed in the two corners in the front side.

Figure 4A:
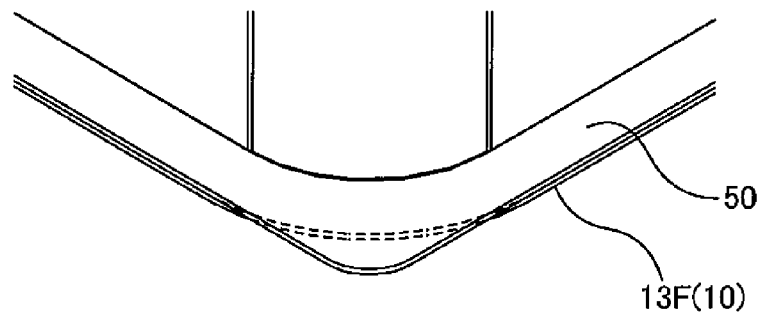
FIG. 4A is an explanatory view of a curve of a corner of the upper lid 50.
Figure 4B:
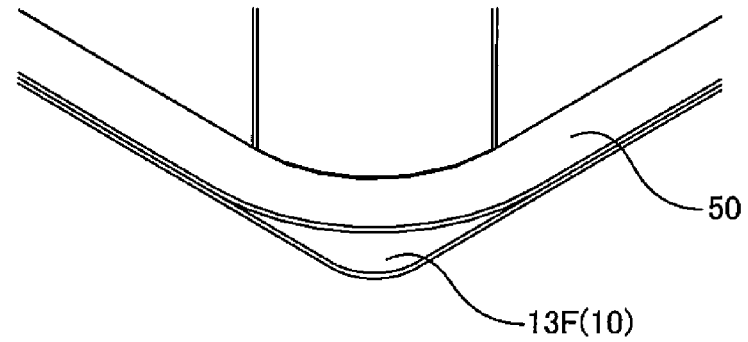
FIG. 4B is an explanatory view of another example of a curve of a corner of the upper lid 50.

The fiber passage groove 13D is a groove to guide the optical fiber 3 in between the inside and the outside of the body 10, and is a groove through which the optical fiber 3 passes during housing or during setting the optical fiber 3. The fiber passage groove 13D is formed along the front-rear direction which is to be a tangential direction of the inner surface 13A. In the center portion of the fiber passage groove 13D is formed a connector housing portion 13E. The connector housing portion 13E is a section that houses the connector 5. A lower edge of the outer surface 13B is formed with an edge bottom portion 13F to place the housing case 1 on the placement surface. As shown in FIG. 4A, the edge bottom portion 13F overlaps with the edge bottom portion of the upper lid 50, but the radius of the curve (namely R) of the four corners of the edge bottom portion 13F is larger than that of the upper lid 50. Thus, the four corners of the upper lid 50 project outwards than the body 10, and the protruded part functions as a "knob" for a finger to catch on, and the upper lid 50 can be easily removed from the body 10. But, the radius of the curve of the four corners of the edge bottom portion 13F may be smaller than or the same as that of the upper lid 50 as shown in FIG. 4B.

Figure 5A:
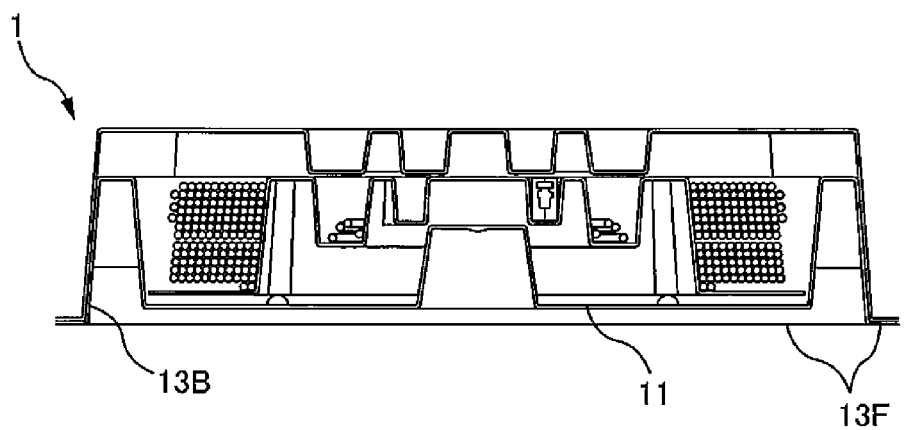
FIG. 5A is an explanatory view of a structure in which the housing case 1 can be loaded.
Figure 5B:
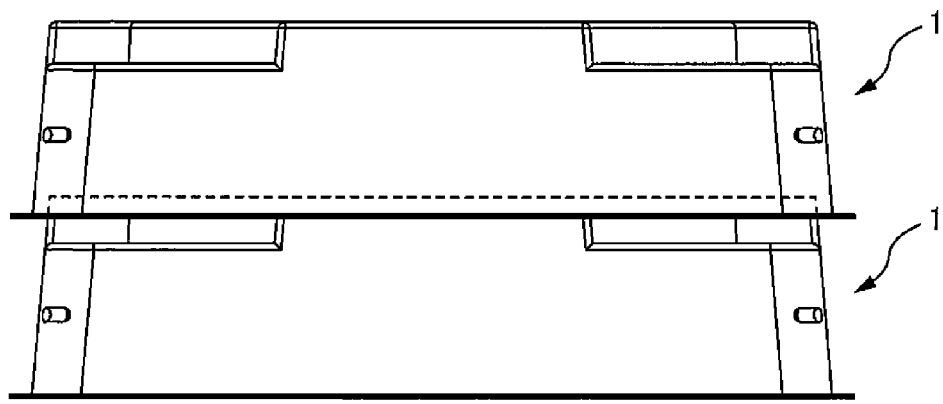
FIG. 5B is a side view of the manner in which the housing cases 1 are loaded.

FIG. 5A is an explanatory view of a configuration that makes it possible to load the housing case 1. FIG. 5B is a side view of the manner of loading the housing case 1.

The outer surface 13B of the edge portion 13 is slanted toward the outside the closer the surface gets to the lower end. Further, the lower surface of the bobbin housing portion 11 is formed slightly to the upper side than the edge bottom portion 13F. For this reason, when the housing cases 1 are stacked, the upper portion of the lower housing case 1 settles inside the edge bottom portion 13F of the upper housing case 1, and thus the housing cases 1 can be more easily stacked.

Bobbin 30

Figure 6A:
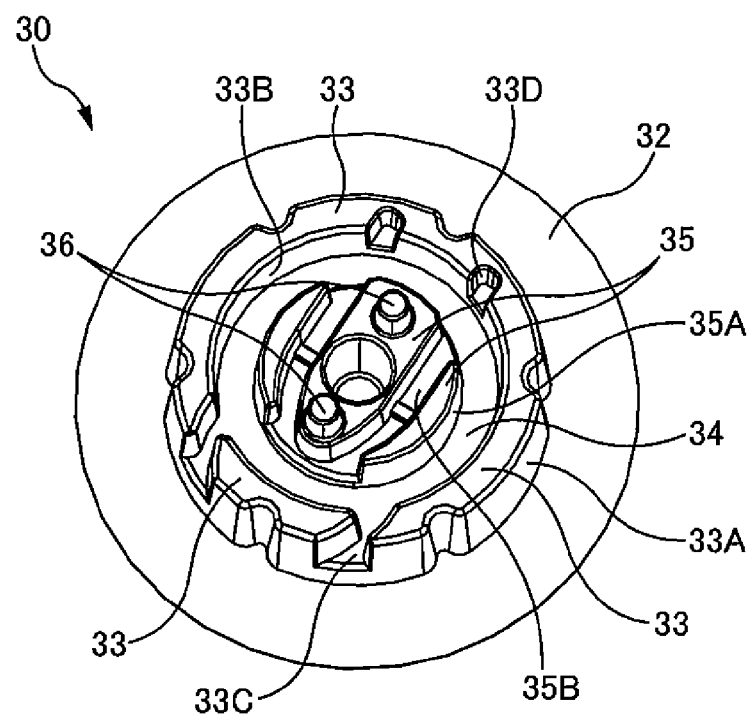
FIG. 6A is a perspective view of a bobbin 30 seen from above right.
Figure 6B:
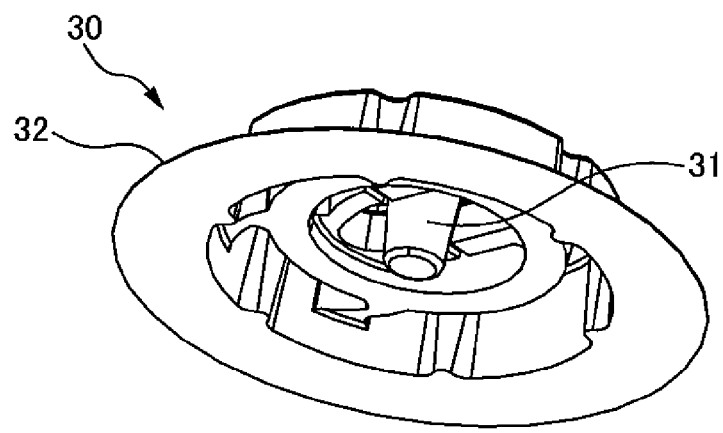
FIG. 6B is a perspective view of the bobbin 30 seen from below right.
Figure 6C:
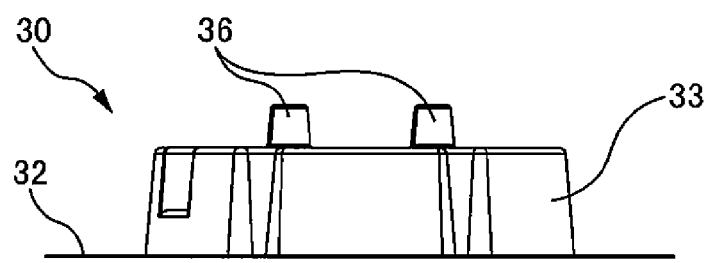
FIG. 6C is a side view of the bobbin 30 seen from the right.
Figure 7A:
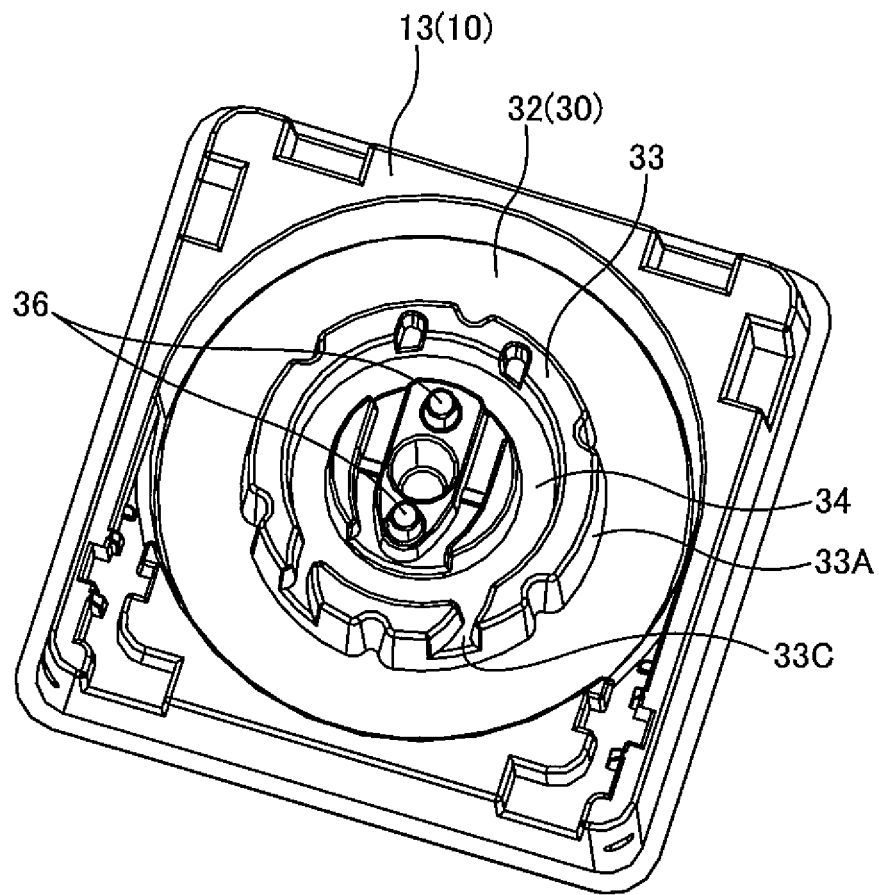
FIG. 7A is a perspective view of the manner in which the bobbin 30 is housed in the body 10.
Figure 7B:
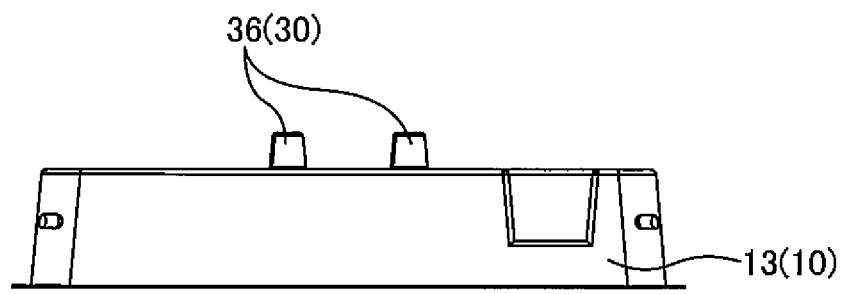
FIG. 7B is a side view of the manner in which the bobbin 30 is housed in the body 10.

FIG. 6A is a perspective view of the bobbin 30 seen from above right. FIG. 6B is a perspective view of the bobbin 30 seen from below right. FIG. 6C is a side view of the bobbin 30 seen from the right. FIG. 7A is a perspective view of the manner in which the bobbin 30 is housed in the body 10. FIG. 7B is a side view of the manner in which the bobbin 30 is housed in the body 10.

The bobbin 30 is housed in the bobbin housing portion 11 of the body 10 and is a member (a rotating body) around which the optical fiber 3 is to be wound. The bobbin 30 has a rotation shaft 31, a flange portion 32, a partition portion 33, an inner groove portion 34, a protrusion portion 35, and two projecting portions 36.

The rotation shaft 31 is a shaft to be a rotation center of the bobbin 30 and is formed in the center of the bobbin 30. The rotation shaft 31 is formed in the lower side of the bobbin 30 towards the body 10. The rotation shaft 31 fits in the shaft supporting portion 11A of the body 10, and the bobbin 30 is rotatably supported with respect to the body 10. By the rotation shaft 31 fitting in the shaft supporting portion 11A of the body 10, the position of the rotation shaft 31 of the bobbin 30 becomes stable, the optical fiber 3 can be easily wound around the bobbin 30, and the optical fiber 3 can be easily pulled out from the bobbin 30.

The flange portion 32 is a section that supports from below the optical fiber 3 wound around the bobbin 30. The flange portion 32 is a discal section with the rotation shaft 31 as the center and is formed from the lower edge of the partition portion 33 to the outside. The upper surface of the discal flange portion 32 supports the optical fiber 3 wound around the bobbin 30 (in more detail, an outer wall surface 33A of the partition portion 33). The optical fiber 3 wound around the bobbin 30 is supported from below with the flange portion 32, thus the process to make the bobbin 30 rotate and wind the optical fiber 3 around the bobbin 30 can be made easier.

The lower surface of the flange portion 32 becomes opposed to the bottom surface 11B of the bobbin housing portion 11 of the body 10. The bottom surface 11B of the bobbin housing portion 11 is formed with protruded contact points 11C, thus the lower surface of the flange portion 32 contacts the protruded contact points 11C. It should be noted that, the contact area between the body 10 and the bobbin 30 may be decreased by forming protruding contact points (protrusions on the bobbin side to protrude toward the lower side) on the lower surface of the flange portion 32 of the bobbin 30, instead of forming the protruded contact points 11C in the bobbin housing portion 11 of the body 10.

The partition portion 33 is a section that separates the optical fiber 3 wound around the outside and the optical fiber 3 housed in the inside. The partition portion 33 is a cylindrical section with the rotation shaft 31 as the center, and the optical fiber 3 is wound around the outer wall surface 33A of the partition portion 33. Thus, the radius of the cylindrical outer wall surface 33A is larger than a radius of curvature (allowable radius of curvature) that is allowed with the optical fiber 3. The partition portion 33 is arranged between the flange portion 32 and the inner groove portion 34. The partition portion 33 is formed with a fiber groove 33C and a connector end fixing portion 33D. The fiber groove 33C is a groove to lead the optical fiber 3 between the inside and the outside of the partition portion 33. The connector end fixing portion 33D is a groove to fix the end portions of the connector 5, and is formed in the inside of the partition portion 33. It should be noted that, the connector end fixing portion 33D is formed shallower than the inner groove portion 34. It should be note that, in the case that there is no connector at the end portion of the optical fiber 3 that is inside, the connector end fixing portion 33D does not have to be provided.

The inner groove portion 34 is a section that houses the optical fiber 3 inside the partition portion 33. The inner groove portion 34 is an annular groove with the rotation shaft 31 as the center and is formed inside the partition portion 33. For example, in the case of housing the optical fiber 3 with a length of approximately 100 meters in the housing case 1, approximately 2 to 3 meters of the optical fiber 3 is housed in the inner groove portion 34, and the remaining optical fiber 3 is wound around the outer wall surface 33A of the partition portion 33. The radius of the annular inner groove portion 34 is larger than the allowable radius of curvature of the optical fiber 3. By housing the optical fiber 3 in the inner groove portion 34, even in the state where the optical fiber 3 is wound around the outer wall surface 33A of the partition portion 33, the optical fiber 3 (and the connector 5 at the terminal end thereof) housed in the inner groove portion 34 can be pulled out.

It should be noted that, the bottom surface of the inner groove portion 34 is formed more to the upper side than the flange portion 32. In other words, the inner groove portion 34 is a groove formed shallower than the upper surface of the flange portion 32. For this reason, the optical fiber 3 can be more easily housed in the inner groove portion 34, and also the optical fiber 3 housed in the inner groove portion 34 can be easily taken out.

The protrusion portion 35 is a section formed inside the inner groove portion 34. The protrusion portion 35 is a columnar section with the rotation shaft 31 in the center. The inner groove portion 34 is in between the outer radius surface 35A of the protrusion portion 35 and the inner wall surface 33B of the partition portion 33, and the optical fiber 3 is to be housed therein. The radius of the peripheral surface 35A of the columnar protrusion portion 35 is larger than the allowable radius of curvature of the optical fiber 3. The protrusion portion 35 is formed with the connector fixing portion 35B. The connector fixing portion 35B is a groove (a depression) for fixing the connector 5. The connector fixing portion 35B is formed so as to be able to include a boot to protect the optical fiber 3. The connector end fixing portion 33D of the partition portion 33 is positioned on an extension of the connector fixing portion 35B. It should be noted that, the connector fixing portion 35B is formed shallower than the inner groove portion 34, as similar to the connector end fixing portion 33D. It should be noted that, in the case that there is no connector in an end portion of the optical fiber 3 that is inside, the connector fixing portion 35B does not have to be provided.

The projecting portion 36 is a section protruding to the upper side than other sections of the bobbin 30 (refer to FIG. 6C). Two projecting portions 36 are provided, and arranged so as to sandwich the rotation shaft 31. When the optical fiber 3 is wound around the bobbin 30, the projecting portions 36 are held by hand, and the bobbin 30 is rotated. In other words, the projecting portions 36 have the function as a "knob" to rotate the bobbin 30. The projecting portions 36 are projecting toward the upper side more than not only the other sections of the bobbin 30, but also are projecting more to the upper side than the body 10 (refer to FIG. 7B). Thus, the projecting portions 36 are easier to hold by hand.

Further, the projecting portions 36 have the function of attaching the upper lid 50 that has been turned over. Further, the projecting portions 36 have the function to prevent rotation of the bobbin 30 during storage. These functions will be described in detail later.

Upper Lid 50

Figure 8A:
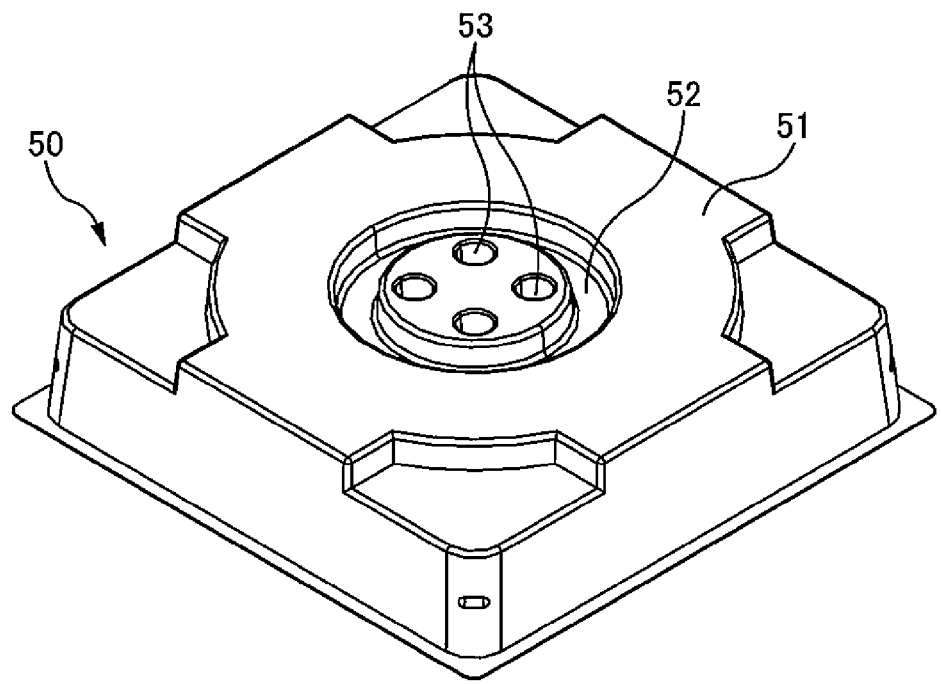
FIG. 8A is a perspective view of the upper lid 50 seen from above right.
Figure 8B:
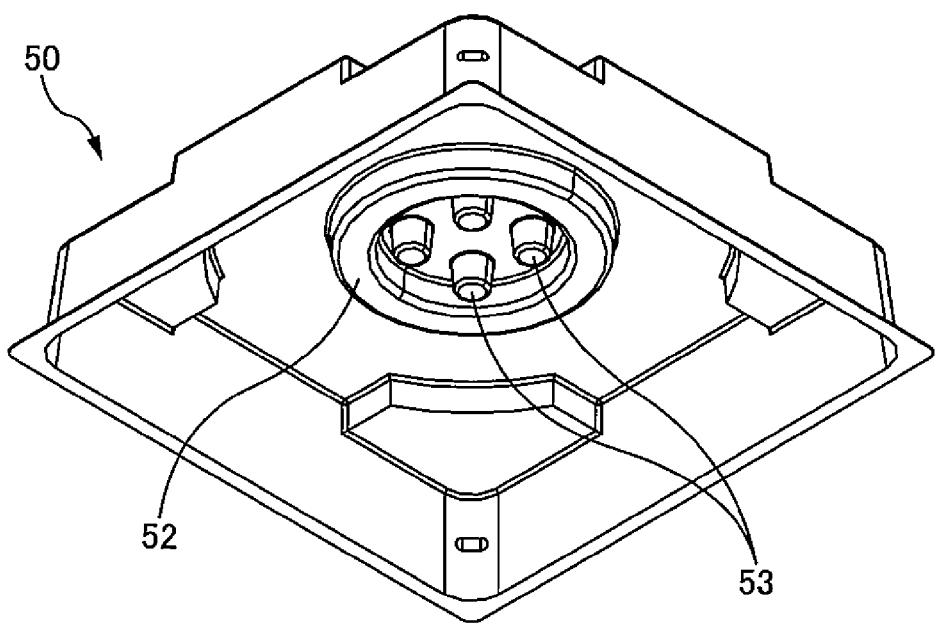
FIG. 8B is a perspective view of the upper lid 50 seen from below right.

FIG. 8A is a perspective view of the upper lid 50 seen from above right. FIG. 8B is a perspective view of the upper lid 50 seen from below right.

The upper lid 50 is a lid to cover the body 10 and the bobbin 30 from above. The upper lid 50 has a function as a cover to protect the optical fiber 3 housed in the housing case 1 from dust and the like. Thus, the upper surface 51 of the upper lid 50 is configured so as to cover at least the bobbin housing portion 11 of the body 10. In the case that the optical fiber 3 is wound around the outer wall surface 33A of the bobbin 30, the upper surface 51 of the upper lid 50 covers the upper side of the optical fiber 3 wound around the outer wall surface 33A of the bobbin 30.

A central portion of the upper lid 50 is formed with four recesses 53. The recesses 53 are to fit with the projecting portions 36 of the bobbin 30 when turning over the upper lid 50 and attaching the upper lid to the bobbin 30. In other words, the recesses 53 have a function of attaching the upper lid 50 that has been turned over to the bobbin 30. The recesses 53 are protruding downwards from the upper surface 51 when seen from below the upper lid 50. In this way, the back side of the recesses 53 has protrusions that are protruded toward the bobbin, thus the "recesses 53" are in some cases referred to as "protrusions 53". In the below description, according to the function of the above section, the above section is referred to as the "recesses 53" or as the "protrusions 53". During storage of the housing case 1, the protrusions 53 (in more detail, the side surfaces of the protrusions 53) contact the projecting portions 36 (in more detail, the side surfaces of the projecting portions 36) of the bobbin 30, so that rotation of the bobbin 30 is inhibited. In other words, the protrusions 53 (recesses 53) have the function to inhibit rotation of the bobbin 30. These functions of the protrusions 53 (the recesses 53) will be described in detail later.

The upper lid 50 is formed with an annular recess 52 to surround the four recesses 53. The annular recess 52 is formed so as to oppose the inner groove portion 34 of the bobbin 30. The annular recess 52 protrudes to the lower side from the upper surface 51 when the upper lid 50 is seen from below. In this way, the back side of the annular recess 52 is an annular protrusion protruding toward the bobbin, thus the "annular recess 52" is in some cases referred to as an "annular projection 52". In the below description, according to the function of the above section, the above section is in some cases referred to as the "annular recess 52" or is referred to as the "annular projection 52". The annular projection 52 (the annular recess 52) has a function to prevent the connector 5 that has been fixed with the connector end fixing portion 33D and the connector fixing portion 35B of the bobbin 30 from dropping out. The above mentioned function of the annular projection 52 (annular recess 52) will be described in detail later.

<Optical Fiber Housing Method>

Figure 9:
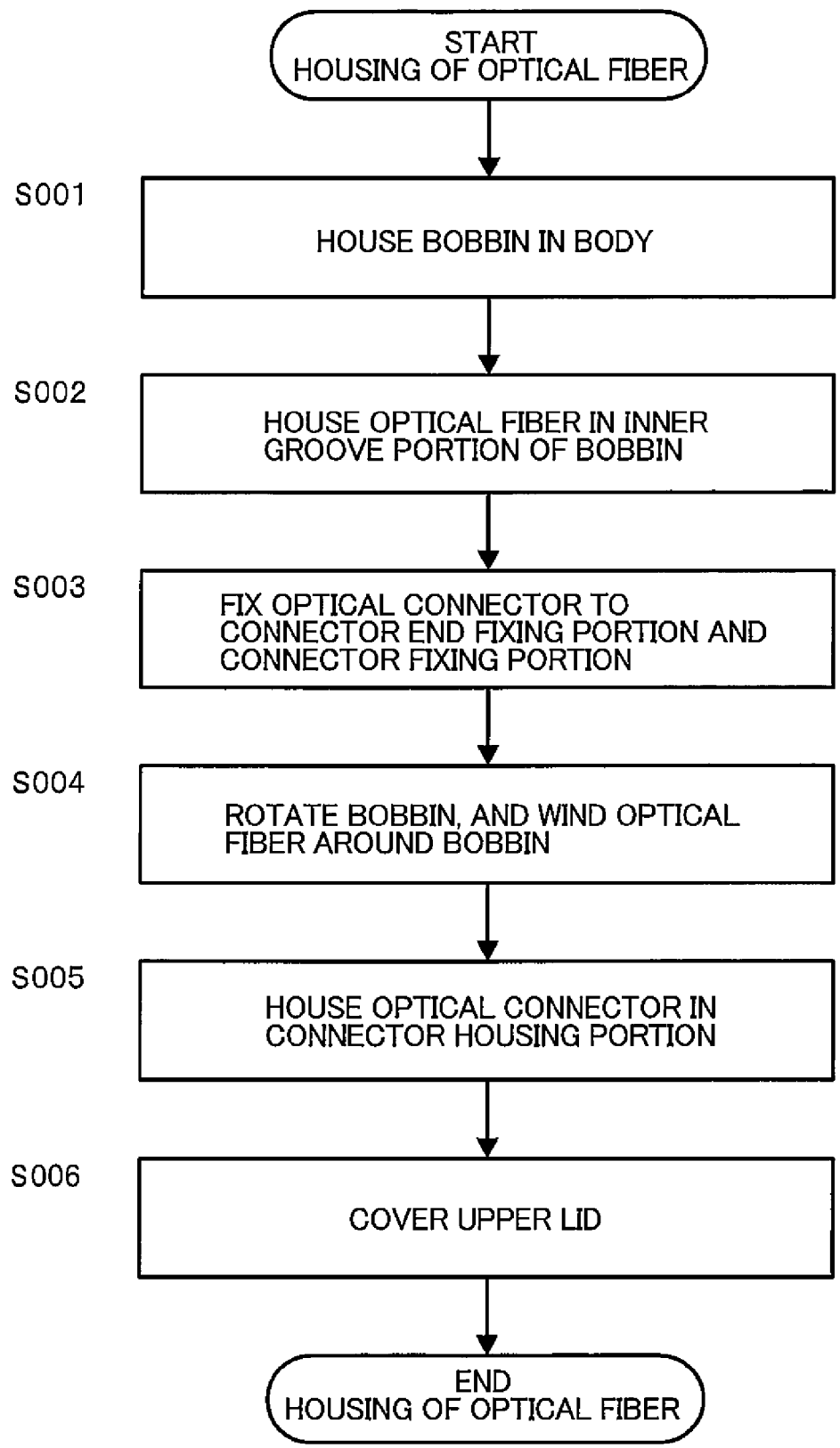
FIG. 9 is a flow chart of a method of housing an optical fiber 3 in the housing case 1.

FIG. 9 is a flow chart of a method for housing the optical fiber 3 in the housing case 1.

As shown in FIG. 7A, first, the operator houses the bobbin 30 in the bobbin housing portion 11 of the body 10 (S001). At this time, the operator fits the rotation shaft 31 of the bobbin 30 to the shaft supporting portion 11A of the body 10, and houses the bobbin 30 rotatably with respect to the body 10. At this stage, the upper lid 50 is in a state removed from the body 10 and the bobbin 30.

Figure 10:
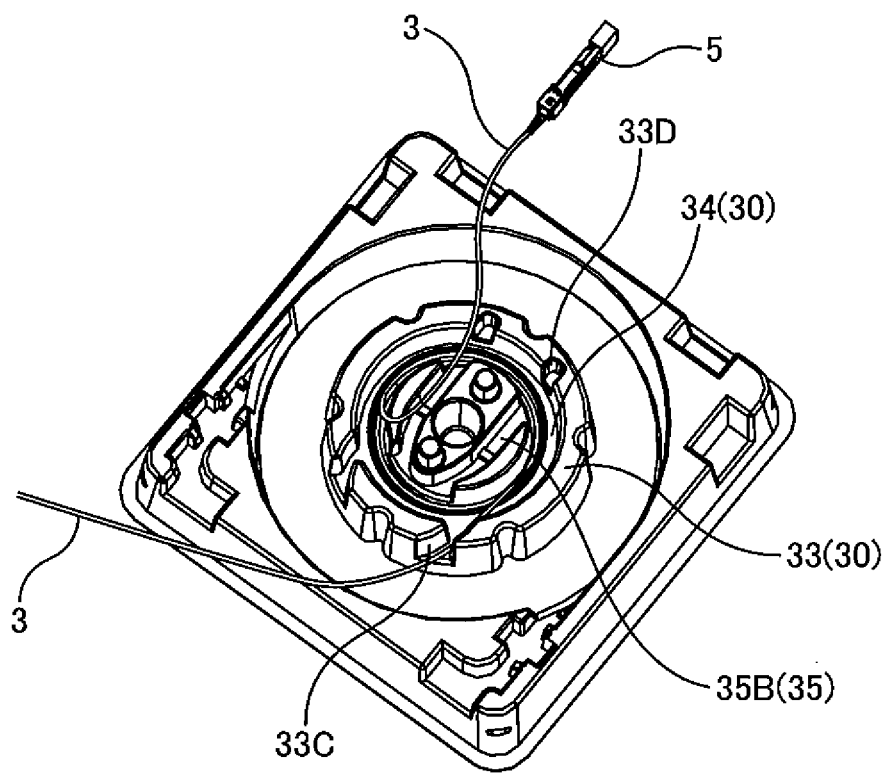
FIG. 10 is a perspective view of a manner of housing the optical fiber 3 in an inner groove portion 34.

Next, the operator gently winds approximately two to three meters of the optical fiber 3 around the inner groove portion 34 of the bobbin 30 and houses the optical fiber (S002). FIG. 10 is a perspective view of the manner of housing the optical fiber 3 in the inner groove portion 34. After the operator winds the optical fiber 3 around the bobbin 30, the operator winds around the inner groove portion 34 of the bobbin 30 the optical fiber 3 of a length that needs to be drawn out and houses the optical fiber 3. Since the inner groove portion 34 is formed annularly, the optical fiber 3 can be wound around the inner groove portion 34 and housed therein, thus the optical fiber 3 can be housed efficiently in a small space.

It should be noted that, after housing the optical fiber 3 in the inner groove portion 34 of the bobbin 30, the operator using the fiber groove 33C guides the optical fiber 3 from the inside to the outside of the partition portion 33. Thus, when the operator rotates the bobbin 30 the next time, the optical fiber 3 is wound around the outer wall surface 33A of the partition portion 33.

Figure 11A:
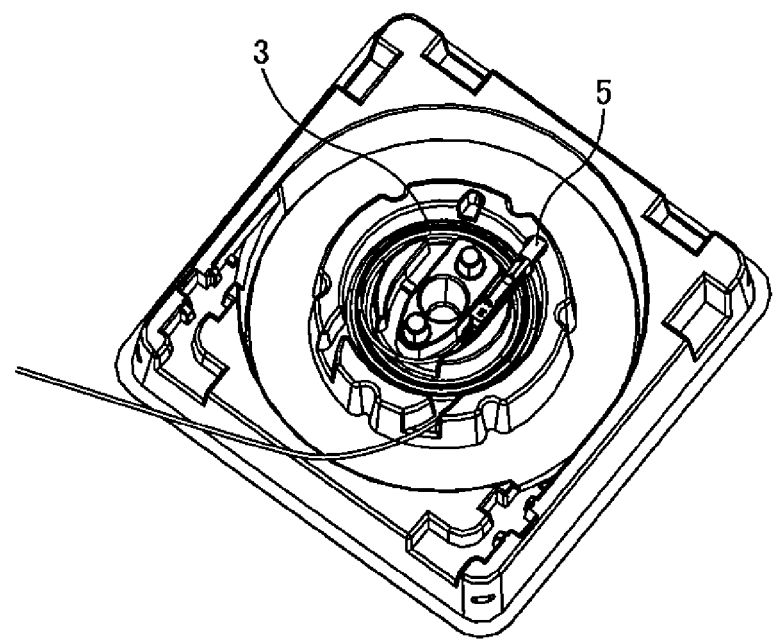
FIG. 11A is a perspective view of a manner of housing the optical fiber 3 in the inner groove portion 34.
Figure 11B:
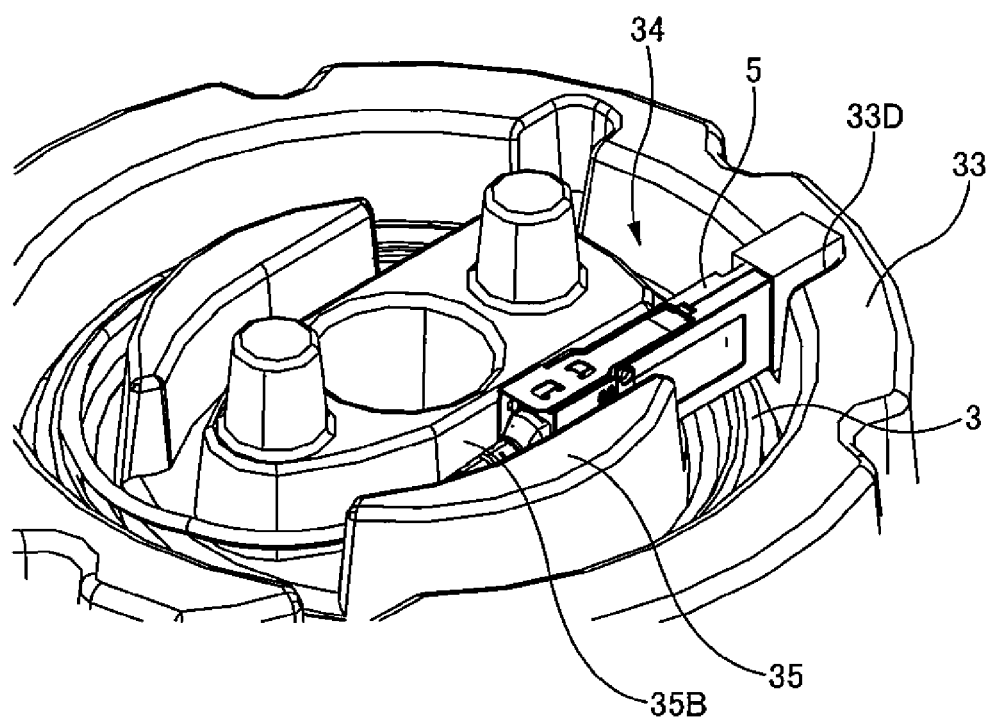
FIG. 11B is a perspective view of a connector 5 fixed to a connector end fixing portion 33D and a connector fixing portion 35B.

In the case that there is the connector 5 at the terminal end of the optical fiber 3 that is housed in the inner groove portion 34, the operator fixes the connector 5 to the connector end fixing portion 33D and the connector fixing portion 35B of the bobbin 30 (S003). FIG. 11A is a perspective view of the manner of housing the optical fiber 3 in the inner groove portion 34. FIG. 11B is a perspective view of the connector 5 fixed to the connector end fixing portion 33D and the connector fixing portion 35B.

The connector end fixing portion 33D is formed in the partition portion 33, and the connector fixing portion 35B is formed in the protrusion portion 35, thus when the connector 5 is fixed to the connector end fixing portion 33D and the connector fixing portion 35B, the connector 5 is arranged so as to stride over the inner groove portion 34. In addition, the connector end fixing portion 33D and the connector fixing portion 35B are formed shallower than the inner groove portion 34, thus the connector 5 is arranged so as to stride over above the optical fiber 3 housed in the inner groove portion 34. In this way, when the connector 5 is fixed to the connector end fixing portion 33D and the connector fixing portion 35B, it becomes difficult for the optical fiber 3 housed in the inner groove portion 34 to come off.

FIG. 12A is a comparative view of housing the connector 5 in the inner groove portion 34 without providing a connector fixing portion 35B. As shown in the drawing, the connector 5 cannot be housed unless the connector 5 is short, thus there are large restrictions regarding the shape and size of the connector 5 that can be housed. Further, the optical fiber 3 (or the boot) that extends out from the connector 5 is bent with the partition portion 33, and is easily damaged. Further, FIG. 12B is a comparative view in which the connector 5 is fixed with only the connector fixing portion 35B of the protrusion portion 35, without providing the connector end fixing portion 33D to the partition portion 33. As shown in the figure, when the size of the connector 5 becomes too long, the optical fiber 3 that extends out from the connector 5 is bent with the partition portion 33, and is easily damaged. On the other hand, according to the configuration shown in FIG. 11B, compared to the comparative views of FIG. 12A and FIG. 12B, even if the size of the connector 5 becomes too long, the radius of curvature of the optical fiber 3 that extends out from the connector 5 can be satisfactorily secured. In particular, since the connector fixing portion 35B is formed to include a boot, the optical fiber 3 that extends out from the connector 5 can be prevented from being bent with the partition portion 33.

Figure 13A:
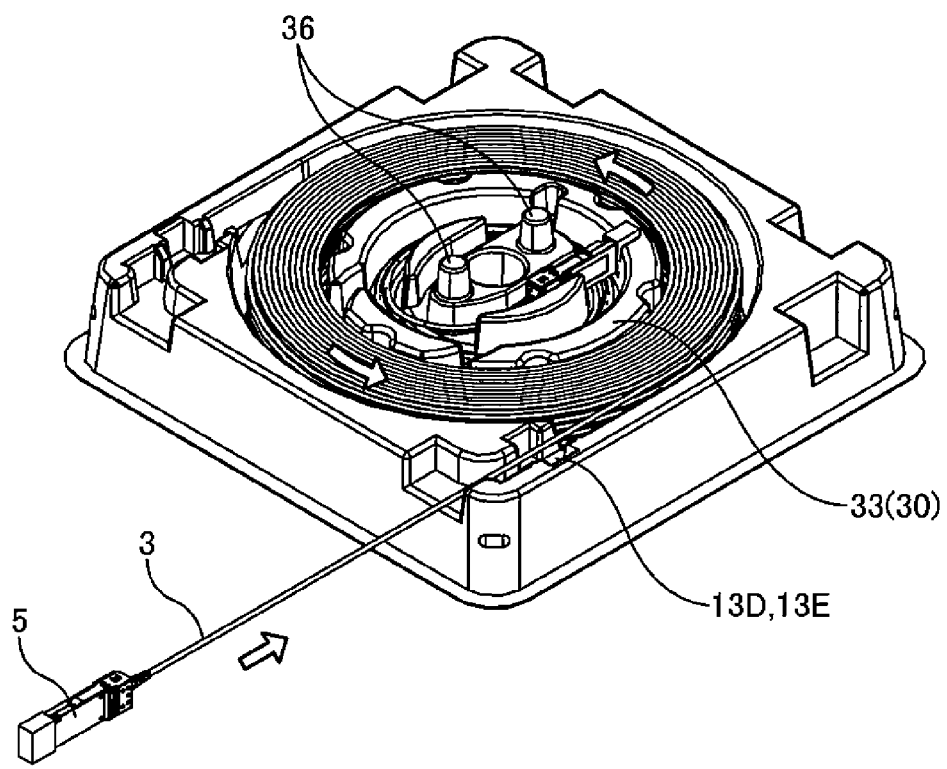
FIG. 13A is a perspective view of a manner of winding the optical fiber 3 around the bobbin 30.

Next, the operator rotates the bobbin 30, and winds the optical fiber 3 around the bobbin 30 (S004). FIG. 13A is a perspective view of the manner of winding the optical fiber 3 around the bobbin 30. The operator holds the projecting portions 36 of the bobbin 30 by hand, and rotates the bobbin 30 anticlockwise when seen from above here. When the bobbin 30 is rotated, the optical fiber 3 that has been guided outside the partition portion 33 with the fiber groove 33C is wound around along the outer wall surface 33A of the partition portion 33.

The optical fiber 3 wound around the outer wall surface 33A is supported from below with the flange portion 32. In this way, the bobbin 30 can be easily rotated together with the optical fiber 3 that has already been wound around thereon, and the process of winding the optical fiber 3 around the bobbin 30 becomes easier. Assuming that there is no flange portion 32 in the bobbin 30, the bobbin 30 is rotated while the optical fiber 3 wound around the bobbin 30 is dragged on the bottom surface 11B of the body 10, thus it becomes difficult for the bobbin 30 to rotate, and there is a burden in the process of winding the optical fiber 3 around the bobbin 30.

It should be noted that, when rotation of the bobbin 30 is started, the operator arranges the optical fiber 3 in the fiber passage groove 13D of the edge portion 13 of the body 10. For this reason, the optical fiber 3 can be wound around the bobbin 30 while being passed through the fiber passage groove 13D, thus tangling of the optical fiber 3 is inhibited.

Figure 13B:
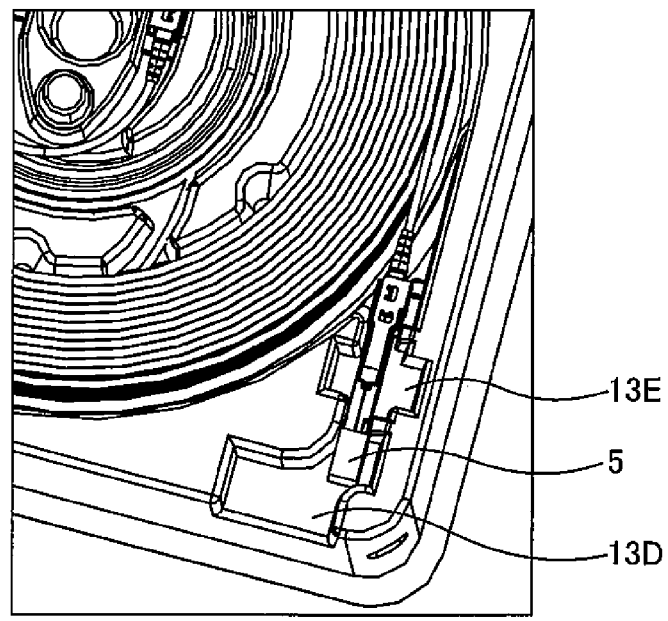
FIG. 13B is a perspective view of a manner of housing the connector 5 in a connector housing portion 13E.

Next, after the operator has wound the optical fiber 3 around the bobbin 30, the operator houses the connector 5 in the connector housing portion 13E of the body 10 (S005). FIG. 13B is a perspective view of a manner of housing the connector 5 in the connector housing portion 13E. Since the connector housing portion 13E is formed in the fiber passage groove 13D, in the case that the optical fiber 3 is wound around the bobbin 30 while the optical fiber 3 is being passes through the fiber passage groove 13D, the terminal end connector 5 is naturally carried near to the connector housing portion 13E, thus the process of the operator housing the connector 5 in the connector housing portion 13E is easy.

Finally, the operator covers the body 10 and the bobbin 30 (and the optical fiber 3) from above with the upper lid 50 (S006), and completes the housing operation of the optical fiber 3. The housing case 1 is stored in a state covered with the upper lid 50. By covering the optical fiber 3 with the upper lid 50, the optical fiber 3 is protected from dust and the like.

<During Storage of the Housing Case>
Rotation Prevention Mechanism

During transporting of the housing case 1, vibration is applied to the housing case 1, and the bobbin 30 is inclined to move. In particular, the bobbin 30 has a flange portion 32, thus is configured to easily rotate together with the optical fiber 3. In addition, the bobbin housing portion 11 is formed with protruded contact points 11C, and the bobbin 30 is configured to be more easily rotated. But, when the bobbin 30 rotates inside the housing case 1 during storage of the housing case 1, there is a possibility that the optical fiber 3 may be damaged. Thus, the housing case 1 is provided with a rotation prevention mechanism to prevent rotation of the bobbin 30.

Figure 14A:
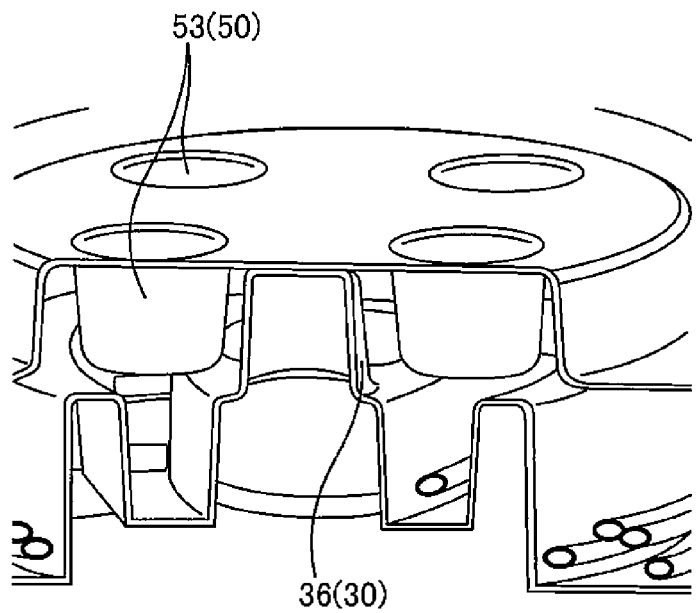
FIG. 14A is a sectional perspective view for explaining a rotation prevention mechanism.
Figure 14B:
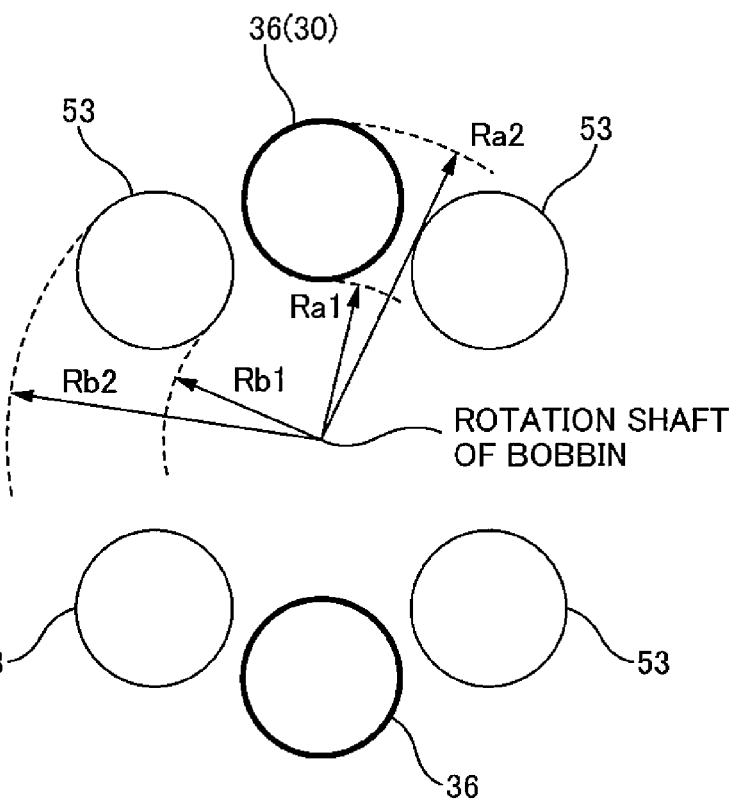
FIG. 14B is an explanatory view of positional relationships of projecting portions 36 and protrusions 53 (recesses 53).

FIG. 14A is a sectional perspective view describing the rotation prevention mechanism. FIG. 14B is an explanatory view of the positional relationship of the projecting portions 36 and the protrusions 53 (recesses 53). The bold lines in FIG. 14B show the arrangement of the projecting portions 36, and the thin lines in the figure show the arrangement of the protrusions 53.

The rotation prevention mechanism is configured with the projecting portions 36 of the bobbin 30 and the protrusions 53 (recesses 53) of the upper lid 50. The projecting portions 36 of the bobbin 30 are formed projecting to the side of the upper lid 50, and the protrusions 53 of the upper lid 50 are formed protruding to the side of the bobbin 30. Here, the projecting portions 36 and the protrusions 53 (recesses 53) are formed in positions where the projecting portions 36 (in more detail, the side surfaces of the projecting portions 36) and the protrusions 53 (in more detail, the side surfaces of the protrusions 53) come into contact when the bobbin 30 is rotated. As a result of this, the rotation of the bobbin 30 is prevented.

In FIG. 14B, a distance from the rotation shaft 31 of the bobbin 30 is referred to as R, and the arrangement of the projecting portions 36 of the bobbin 30 and the protrusions 53 (recesses 53) of the upper lid 50 are shown. The range in which the projecting portions 36 of the bobbin 30 are in is $Ra1<R<Ra2$. Here, $Ra1$ is a distance from the rotation shaft 31 to a section of the nearest projecting portion 36. $Ra2$ is a distance from the rotation shaft 31 to a section of the farthest projecting portion 36. The range in which the protrusions 53 (recess 53) of the upper lid 50 are in is $Rb1<R<Rb2$. Here, $Rb1$ is a distance from the rotation shaft 31 to a section of the nearest protrusion 53 (recess 53). $Rb2$ is a distance from the rotation shaft 31 to a section of the farthest protrusion 53 (recess 53).

The condition in which the projecting portions 36 and the protrusions 53 (recess 53) come into contact when the bobbin 30 is rotated is for the range in which the projecting portions 36 of the bobbin 30 are in ($Ra1<R<Ra2$) and the range in which the protrusions 53 of the upper lid 50 are in ($Rb1<R<Rb2$) to at least partially overlap. In other words, the condition in which the projecting portions 36 and the protrusions 53 come into contact when the bobbin 30 is rotated is that at least one of $Ra1<Rb1<Ra2$ and $Ra1<Rb2<Ra2$ is satisfied (or, at least one of $Rb1<Ra1<Rb2$ and $Rb1<Ra2<Rb2$ is satisfied). In other words, when this condition is satisfied, the projecting portions 36 and protrusions 53 come into contact, thus the rotation of the bobbin 30 is prevented. It should be noted that, here the upper lid 50 is turned over and the projecting portions 36 and the protrusions 53 (recesses 53) are made to fit (described later), thus the range in which the projecting portions 36 are in and the range in which the protrusions 53 are in approximately match.

Further, two projecting portions 36 are formed on the bobbin 30, and four protrusions 53 (recesses 53) are formed on the upper lid 50. Each projecting portion 36 of the bobbin 30 is arranged sandwiched by two protrusions 53 in the rotation direction of the bobbin 30. For this reason, in the case where the bobbin 30 rotates in either direction of the clockwise direction and the anticlockwise direction when seen from above, the projecting portions 36 and protrusions 53 come into contact immediately, thus the rotation of the bobbin 30 is inhibited (the rotation amount of the bobbin 30 is small).

Prevention of Dropping Out of Connector

During transporting of the housing case 1, vibration is applied to the housing case 1, and the bobbin 30 is inclined to move. But, when the connector 5 fixed to the bobbin 30 is removed inside the housing case 1, there is a possibility that the optical fiber 3 may be damaged. Thus, the housing case 1 is provided with a mechanism to prevent the connector 5 from dropping out.

Figure 15:
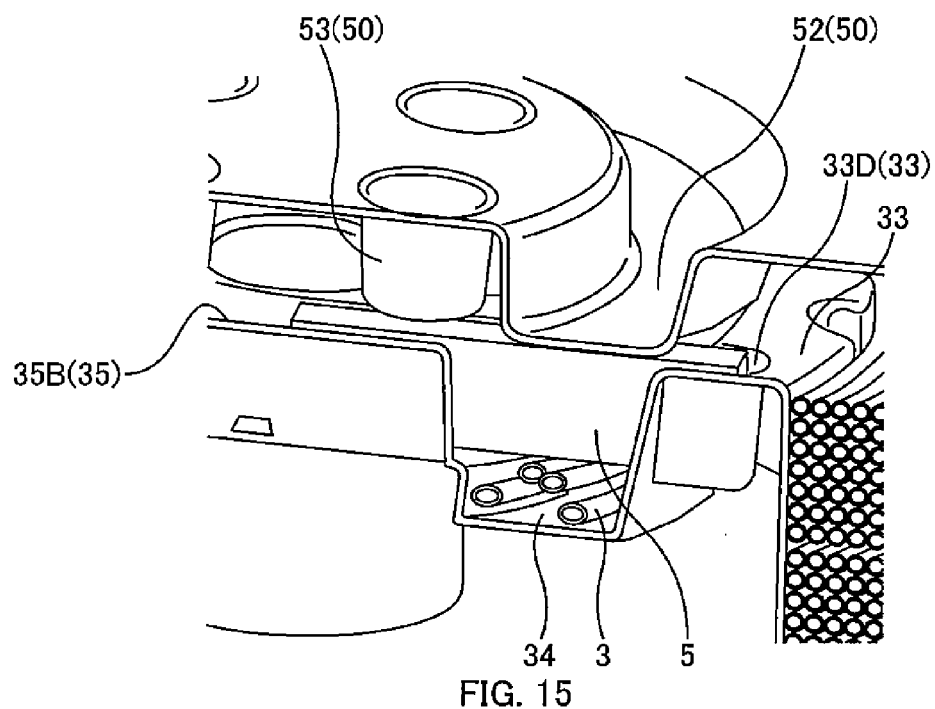
FIG. 15 is a sectional perspective view showing the manner in which the connector 5 has been fixed.

FIG. 15 is a sectional perspective view showing the manner of fixing the connector 5.

The upper side of the connector 5 is arranged with the protrusions 53 (recesses 53) of the upper lid 50. In other words, the connector 5 is fixed in between the connector fixing portion 35B of the bobbin 30 and the protrusions 53 of the upper lid 50. For this reason, the connector 5 fixed in the connector fixing portion 35B is pressed from above with the protrusions 53, and as a result it becomes difficult for the connector 5 to come off inside the housing case 1.

Further, to the upper side of the connector 5 is arranged the annular projection 52 (annular recess 52) of the upper lid 50. The annular projection 52 is formed so as to oppose the inner groove portion 34 of the bobbin 30, thus the annular projection 52 is to be arranged to the upper side of the section of the connector 5 that strides over the inner groove portion 34. For this reason, the section between the connector fixing portion 35B and the connector end fixing portion 33D of the connector 5 is pressed from above with the annular projection 52, and as a result it becomes difficult for the connector 5 to come off inside the housing case 1.

It should be noted that, since the annular projection 52 (annular recess 52) is formed annularly, regardless of the rotation position of the bobbin 30 inside the housing case 1, the annular projection 52 is to be arranged above the connector 5 (in more detail, in a section of the connector that strides over the inner groove portion 34). Thus, when the upper lid 50 is covered over the body 10 and the bobbin 30, the connector 5 will naturally become difficult to come off.

Inspection

Figure 16:
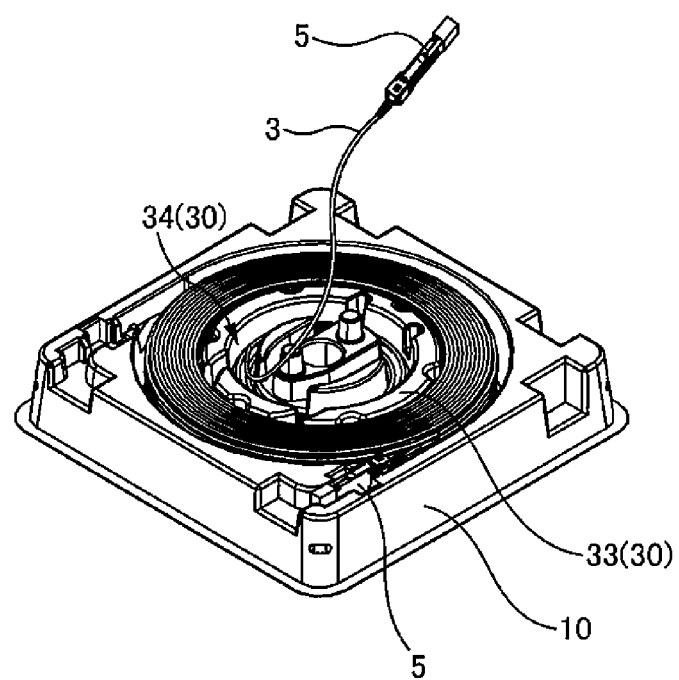
FIG. 16 is an explanatory view during inspection of the optical fiber 3 (or the connector 5).

FIG. 16 is an explanatory view during inspection of the optical fiber 3 (or the connector 5).

During housing of the optical fiber 3, one end side of the optical fiber 3 is housed in the inside of the partition portion 33 (in more detail, the inner groove portion 34), and the remaining optical fiber 3 is guided to the outside of the partition portion 33 with the fiber groove 33C, and wound around the outer wall surface 33A of the partition portion 33. In this way, by housing the optical fiber 3 in the inner groove portion 34 in the inside of the partition portion 33, even in the state where the optical fiber 3 is wound around the outer wall surface 33A of the partition portion 33, the optical fiber 3 housed in the inner groove portion 34 (and the connector 5 at the terminal end of the optical fiber) can be drawn out. Here, approximately two to three meters of the optical fiber 3 housed in the inner groove portion 34 can be drawn out, thus inspection and the like of the optical fiber 3 and the connector 5 becomes easy. It should be noted that, the connector 5 housed in the connector housing portion 13E is originally in a state in which it is easy to draw out the optical fiber 3, thus no problems occur.

Figure 17:
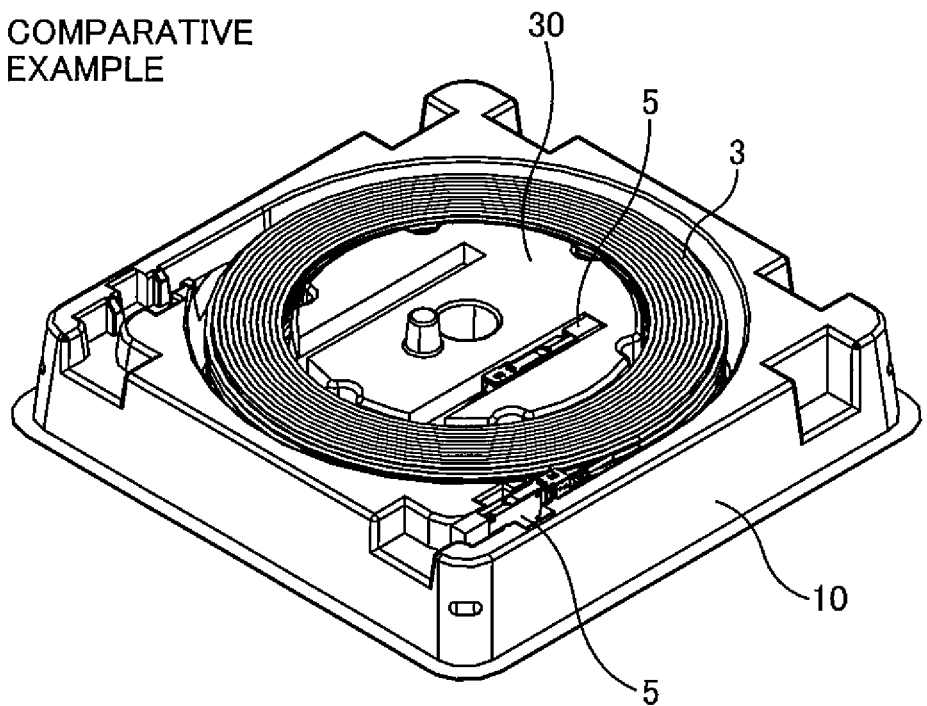
FIG. 17 is a comparative view of the case where the optical fiber 3 is not housed in an inside of a partition portion 33 of the bobbin 30.

FIG. 17 is a comparative view of the case where the optical fiber 3 is not housed in the inside of the partition portion 33 of the bobbin 30. As shown in the drawing, in the case where the optical fiber 3 is not housed in the inside of the partition portion 33 of the bobbin 30, when the optical fiber 3 is wound around the outer wall surface 33A several times, it becomes difficult to take out the optical fiber 3 and the connector 5 that has been housed first before winding around the optical fiber 3.

<Fiber Setting Method>

Figure 18:
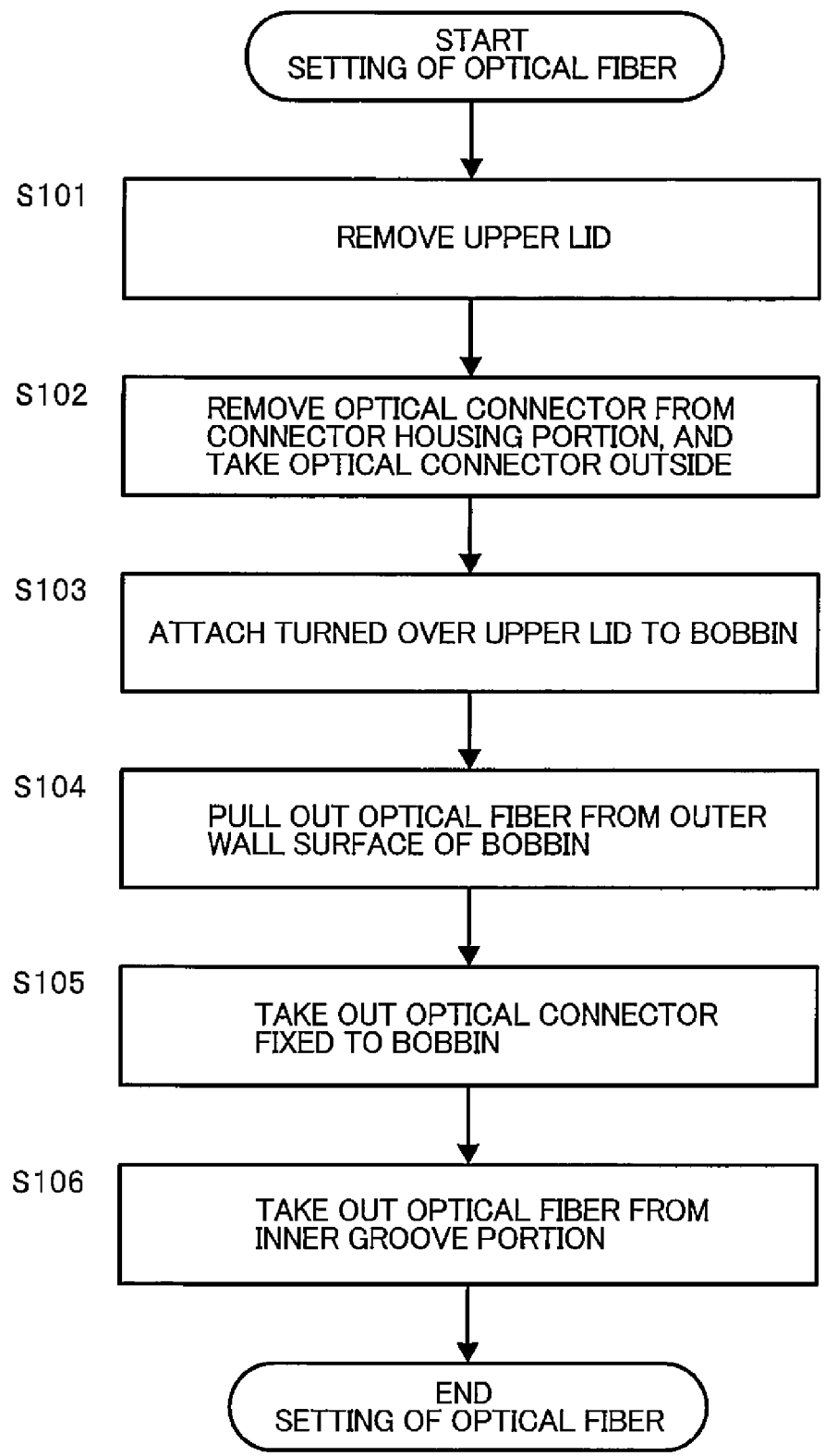
FIG. 18 is a flow diagram of a method of setting the optical fiber 3 in the housing case 1.

FIG. 18 is a flow chart of a method of setting the optical fiber 3 in the housing case 1.

First, as shown in FIG. 1B, the operator removes the upper lid 50 from the body 10 and the bobbin 30 (S101). At this time, the operator catches the part protruding to the outside than the body 10 in the four corners of the upper lid 50 with his/her fingers as a "grip", and may remove the upper lid 50 from the body 10 (refer to FIG. 4A). By removing the upper lid 50, the protrusions 53 (recesses 53) of the upper lid 50 do not come into contact with the projecting portions 36 of the bobbin 30, and the bobbin 30 becomes rotatable (the rotation prevention function is disengaged).

Figure 19:
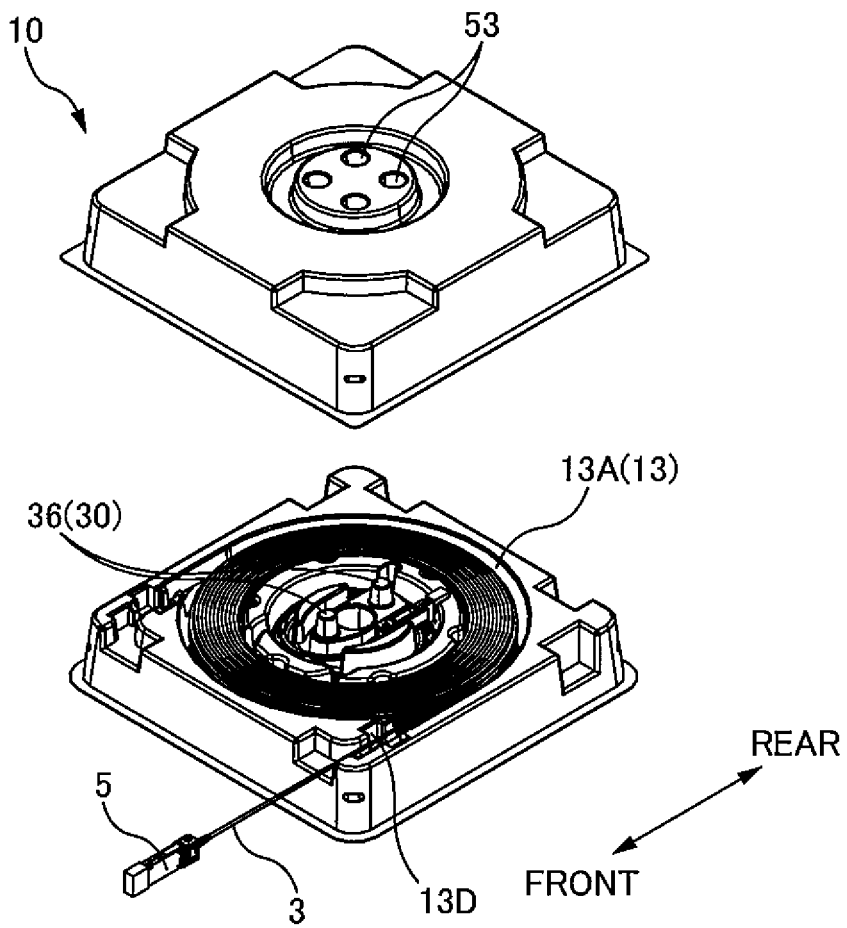
FIG. 19 is an explanatory view of the manner in which the connector 5 is taken outside.

Next, the operator removes the connector 5 from the connector housing portion 13E of the body 10, and takes the connector 5 outside (S102). FIG. 19 is an explanatory view of the manner of taking the connector 5 outside. As shown in the drawing, the operator arranges the optical fiber 3 that has been drawn out with the connector 5 in the fiber passage groove 13D in the edge portion 13 of the body 10 for later operations. It should be noted that, since the connector housing portion 13E is formed in the fiber passage groove 13D, when the connector 5 taken out from the connector housing portion 13E is pulled out to the front side of the body 10, the optical fiber 3 is naturally arranged in the fiber passage groove 13D, thus the operation is easy.

Figure 20A:
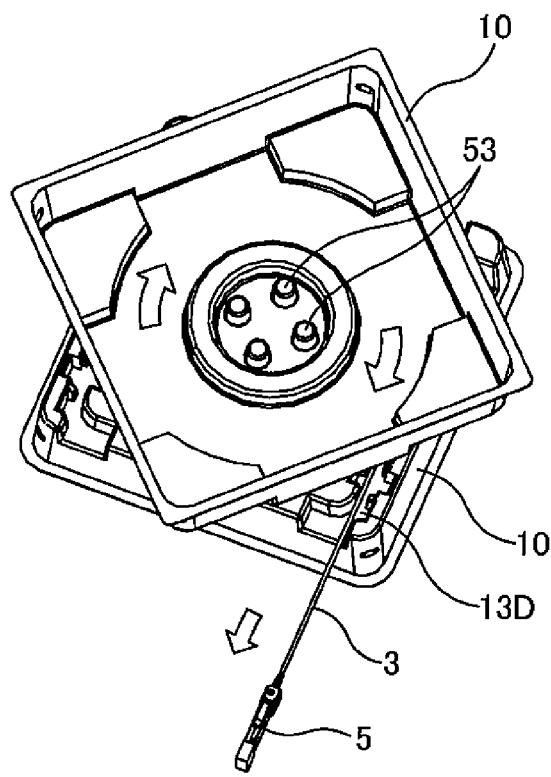
FIG. 20A is an explanatory view of the manner of attaching the turned over upper lid 50 to the bobbin 30.

Next, the operator turns over the upper lid 50, and attaches the turned over upper lid 50 to the bobbin 30 (S103). FIG. 20A is an explanatory view of the manner of attaching the turned over upper lid 50 to the bobbin 30.

When the upper lid 50 is turned over, the openings of the recesses 53 (protrusions 53) of the upper lid 50 face downwards. The operator inserts the projecting portions 36 of the bobbin 30 in the openings of the recesses 53, fits the projecting portions 36 and the recesses 53, and attaches the turned over upper lid 50 to the bobbin 30. In other words, the projecting portions 36 and the protrusions 53 (recesses 53) configuring the rotation prevention mechanism are used to attach the turned over upper lid 50 to the bobbin 30. Thus, compared to the case in which a mechanism that attaches the turned over upper lid 50 to the bobbin 30 and the rotation prevention mechanism are formed separately, the configuration and the shape of the bobbin 30 and the upper lid 50 can be simplified.

The upper lid 50 is configured to cover the upper side of the optical fiber 3 wound around the outer wall surface 33A of the bobbin 30, in order to protect the optical fiber 3 from dust and the like during ordinary storage. When the upper lid 50 that has been configured in this way is turned over and attached to the bobbin 30, the upper surface 51 of the upper lid 50 covers from the upper side the optical fiber 3 wound around the outer wall surface 33A of the bobbin 30.

When attaching the turned over upper lid 50 to the bobbin 30, the operator arranges the optical fiber 3 in a space between the body 10 in the fiber passage groove 13D and the upper lid 50. It should be noted that, in the case that the optical fiber 3 is arranged in the fiber passage groove 13D in advance in the stage of S102, when the turned over upper lid 50 is attached to the bobbin 30, the optical fiber 3 is arranged in a space between the body 10 in the fiber passage groove 13D and the upper lid 50 as is, thus the operation is easy.

Next, the operator pulls out the optical fiber 3 from the outer wall surface 33A of the bobbin 30 (S104). As shown in FIG. 20A, when the operator pulls the optical fiber 3 to the front side, the optical fiber 3 wound around the outer wall surface 33A of the bobbin 30 is pulled out, and the bobbin 30 rotates clockwise when seen from above.

The optical fiber 3 is wound several times around the outer wall surface 33A of the partition portion 33 of the bobbin 30, and the optical fiber 3 is to be pulled out in this state. At this time, since the optical fiber 3 wound around the outer wall surface 33A of the bobbin 30 is covered from above with the upper lid 50, the optical fiber 3 can be prevented from being pulled out going over above the bobbin 30, and the optical fiber 3 can be prevented from becoming tangled.

Figure 20B:
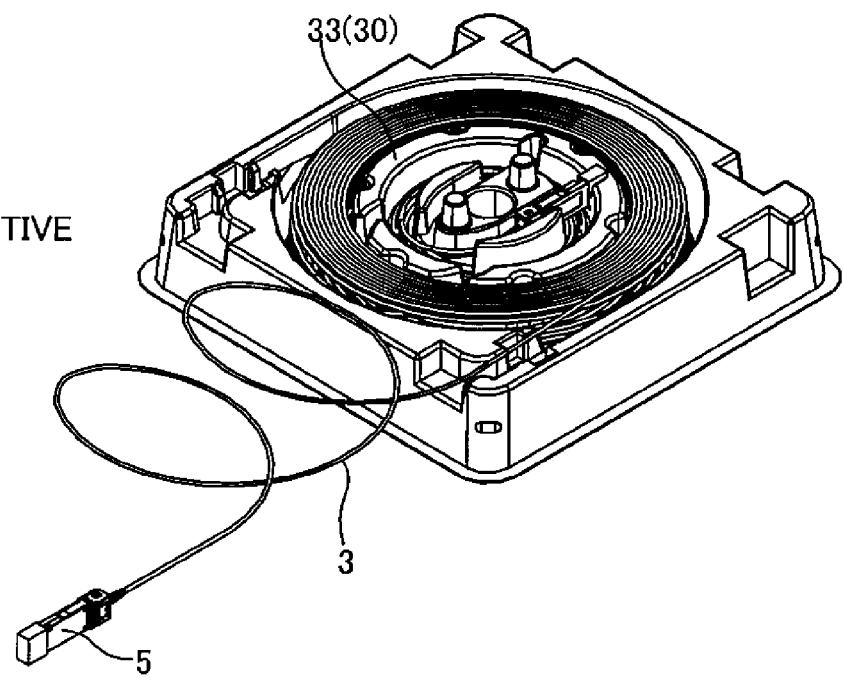
FIG. 20B is a comparative view of the case where the upper lid 50 is not attached to the bobbin 30.

FIG. 20B is a comparative view of the case where the upper lid 50 has not been attached to the bobbin 30. The optical fiber 3 is wound several times around the outer wall surface 33A of the partition portion 33 of the bobbin 30, and when the optical fiber 3 is pulled out in this state, as shown in the drawing, the optical fiber 3 in some cases goes over above the bobbin 30. As a result, the optical fiber 3 is pulled out in the tangled state, and there is a possibility that the optical fiber 3 may be damaged.

As shown in FIG. 20A, when the optical fiber 3 is pulled out, the optical fiber 3 passes through the space between the body 10 in the fiber passage groove 13D and the upper lid 50. Since the optical fiber 3 is sandwiched in between the body 10 and the upper lid 50 in the state that the optical fiber 3 is arranged in the fiber passage groove 13D, it is difficult for the optical fiber 3 to come off the fiber passage groove 13D during pulling out of the optical fiber 3. Thus, the position where the optical fiber 3 is pulled out from the housing case 1 is fixed to the position of the fiber passage groove 13D. It should be noted that, since the fiber passage groove 13D is formed along the front-rear direction that is to be a tangent direction of the inner surface 13A, even if the operator pulls the optical fiber 3 passing through the fiber passage groove 13D, the optical fiber 3 does not bend in a small radius of curvature (equal to or smaller than the allowable radius of curvature).

After the optical fiber 3 is pulled out from the outer wall surface 33A of the bobbin 30 (after S104), the operator removes the upper lid 50 from the bobbin 30 and takes out the connector 5 fixed to the bobbin 30 (S105). After taking out the connector 5 arranged so as to stride over above the optical fiber 3 in the inner groove portion 34, the operator takes out the optical fiber 3 housed in the inner groove portion 34 (S106).

<Different Usage Method of Upper Lid>

During housing of the optical fiber 3, the turned over upper lid 50 may be attached to the bobbin 30.

Figure 21:
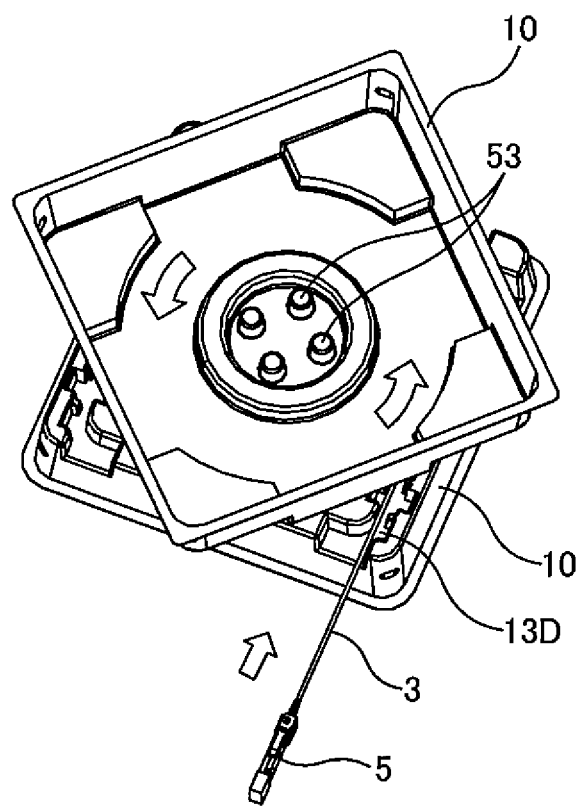
FIG. 21 is an explanatory view of the manner of attaching the turned over upper lid 50 to the bobbin 30 and around which the optical fiber 3 is wound.

FIG. 21 is an explanatory view of the manner of attaching the turned over upper lid 50 to the bobbin 30 and winding the optical fiber 3 thereto. The operator, instead of grasping the projecting portions 36 of the bobbin 30 by hand, grasps the upper lid 50 by hand and rotates the bobbin 30. In other words, the operator uses the turned over upper lid 50 as a jig. Since the upper surface 51 of the upper lid 50 covers from the upper side the optical fiber 3 wound around the outer wall surface 33A of the bobbin 30, the optical fiber 3 does not come off the outer wall surface 33A of the bobbin 30 and can be wound around in a regular manner.

<Different Housing Method of Optical Fiber>

Figure 26:
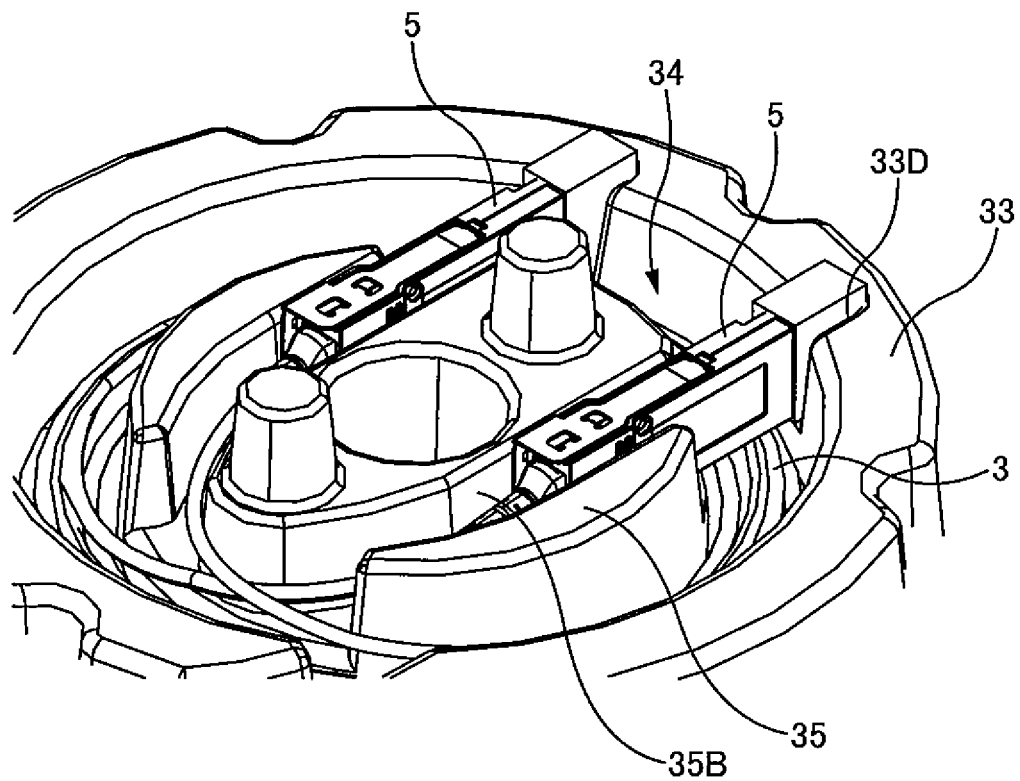
FIG. 26 is an explanatory view of a different housing method of optical fiber.

FIG. 26 is an explanatory view of a different housing method of the optical fiber.

The bobbin 30 is formed disymmetrically, thus two aforementioned fiber grooves 33C are formed in the partition portion 33 of the bobbin 30. When the operator finishes winding the optical fiber 3 around the bobbin 30, instead of housing the connector 5 in the connector housing portion 13E of the body 10, as shown in FIG. 26, the optical fiber 3 can be guided from the outside to the inside of the partition portion 33, via the fiber groove 33C of the bobbin 30. At this time, the fiber groove 33C that guides the optical fiber 3 to the inside of the partition portion 33 is a different one from the fiber groove 33C that has guided the optical fiber 3 that has not yet been wound around the bobbin 30 from the inside to the outside of the partition portion 33. With such a housing method, both end sides of the optical fiber 3 can be housed in the inside of the partition portion 33.

It should be noted that, the bobbin 30 is formed disymmetrically, thus two connector end fixing portions 33D are formed in the partition portion 33 of the bobbin 30, and two connector fixing portions 35B are formed in the protrusion portion 35. Thus, as shown in FIG. 26, when the optical fiber 3 is guided from the outside to the inside of the partition portion 33, via the fiber grooves 33 of the bobbin 30, in the case that there is a connector 5 at the terminal end of the above optical fiber 3, the above connector 5 can be fixed to the connector end fixing portion 33D and the connector fixing portion 35B of the bobbin 30. In this case, after the connector 5 fixed in S003 is temporarily removed, the optical fiber 3 that has been guided to the inside of the partition portion 33 is housed in the inner groove portion 34, both connectors 5 may be fixed in each of the connector end fixing portion 33D and the connector fixing portion 35B.

SUMMARY

The housing case 1 in the first embodiment described above has the body 10 and the bobbin 30 (refer to FIG. 1B). The bobbin 30 is formed with the partition portion 33, and the partition portion 33 is formed with the fiber grooves 33C to guide the optical fiber 3 between the inside and the outside of the partition portion 33 (refer to FIG. 6A). Then, during housing of the optical fiber 3, one end side of the optical fiber 3 is housed in the inside of the partition portion 33 (in more detail, the inner groove portion 34), and the remaining optical fiber 3 is guided to the outside of the partition portion 33 with the fiber grooves 33C and wound around the outer wall surface 33A of the partition portion 33 (refer to FIG. 11A, FIG. 11B, and FIG. 13A). In this way, by housing the optical fiber 3 in the inside of the partition portion 33, even in the state that the optical fiber 3 is wound around the outer wall surface 33A of the partition portion 33, the optical fiber 3 housed in the inside of the partition portion 33 can be pulled out.

Further, in the first embodiment, the annular inner groove portion 34 is formed in the inside of the partition portion 33 (refer to FIG. 6A). In this way, the optical fiber 3 can be wound around and housed in the inner groove portion 34, thus the optical fiber 3 can be efficiently housed in a small space.

Further, in the first embodiment, the protrusion portion 35 is formed in the inside of the inner groove portion 34, and the connector fixing portion 35B is formed in the protrusion portion 35 (refer to FIG. 6A). For this reason, the connector 5 provided to the terminal end of the optical fiber 3 to be housed in the inner groove portion 34 can be fixed (refer to FIG. 11B).

Further, the partition portion 33 in the first embodiment is formed with the connector end fixing portion 33D that fixes the end portion of the connector 5 (refer to FIG. 6A). For this reason, even if the size of the connector 5 is long, the radius of curvature of the optical fiber 3 that extends out from the connector 5 can be satisfactorily secured (refer to FIG. 11B).

Further, in the first embodiment, the connector end fixing portion 33D and the connector fixing portion 35B are formed shallower than the inner groove portion 34. For this reason, when the connector 5 is fixed to the connector end fixing portion 33D and the connector fixing portion 35B, it becomes difficult for the optical fiber 3 housed in the inner groove portion 34 to come off (refer to FIG. 11B).

Further, the upper lid 50 in the first embodiment is formed with the annular projection 52 (annular recess 52) opposing the inner groove portion 34 (refer to FIG. 8A and FIG. 8B). Then, the annular projection 52 (annular recess 52) is arranged to the upper side of the connector 5 fixed to the connector fixing portion 35B and the connector end fixing portion 33D (refer to FIG. 15). For this reason, it becomes difficult for the connector 5 to come off, regardless of the rotation position of the bobbin 30 inside the housing case 1.

Second Embodiment

According to the above-described embodiment, the rotation prevention mechanism to prevent rotation of the bobbin 30 was configured with the four protrusions 53 (recesses 53) formed in the upper lid 50. Further, the turned over upper lid 50 has been attached to the bobbin 30 with the four recesses 53 (protrusions 53) formed in the upper lid 50. The protrusions 53 (recesses 53) however, are not limited to four.

Figure 22:
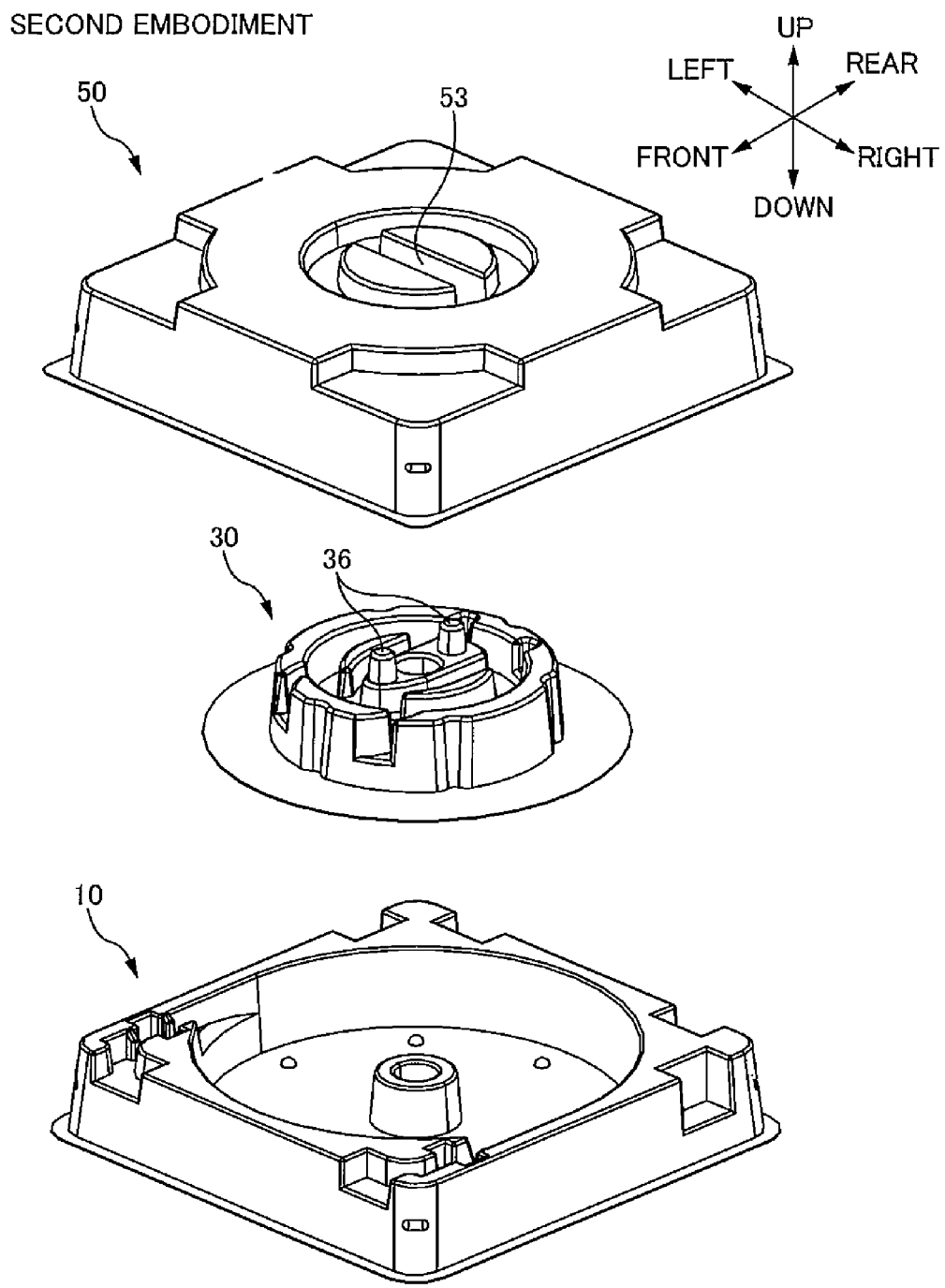
FIG. 22 is an explanatory view of the housing case 1 of a second embodiment.

FIG. 22 is an explanatory view of a housing case 1 of a second embodiment. One recess 53 (protrusion 53) in the shape of a minus shape is formed in a central portion of the upper lid 50. Similar to the first embodiment, the protrusion 53 (recess 53) of the upper lid 50 is formed protruding to the side of the bobbin 30. It should be noted that, in the second embodiment, the projecting portions 36 of the bobbin 30 are formed projecting to the side of the upper lid 50.

During storage of the housing case 1, the operator covers the upper lid 50 on the body 10 and the bobbin 30 so that the direction of the protrusion 53 (recess 53) in the minus shape is orthogonal to a line that connects the two projecting portions 36 of the bobbin 30. For example, as shown in the drawing, when the line that connects the two projecting portions 36 becomes the front-rear direction, the operator makes the protrusion 53 in the minus shape the left-right direction, and covers the upper lid 50 on the body 10 and the bobbin 30. During storage of the housing case 1, the projecting portions 36 and the protrusion 53 are formed in positions in which the projecting portions 36 and the protrusion 53 come into contact when the bobbin 30 is rotated. For this reason, the rotation of the bobbin 30 can be prevented.

When the upper lid 50 is turned over and attached to the bobbin 30, the operator makes the direction of the recess 53 (protrusion 53) in the minus shape in parallel with the line that connects the two projecting portions 36 of the bobbin 30, and fits the projecting portions 36 and the recess 53. For example, as shown in the drawing, when the line that connects the two projecting portions 36 becomes the front-rear direction, the operator makes the minus shaped recess 53 the front-rear direction, and attaches the turned over upper lid 50 to the bobbin 30. For this reason, the optical fiber 3 wound around the bobbin 30 can be covered from the upper side with the upper lid 50.

As described above, the shape and the number of the protrusion 53 (recess 53) are not limited to those in the first embodiment. Similarly, the shape and the number of the projecting portions 36 are not limited to those in the first embodiment, and can be appropriately changed.

It should be noted that, in the second embodiment, similar to the above described first embodiment, during housing of the optical fiber 3, one end side of the optical fiber 3 is housed in the inside of the partition portion 33 (in detail the inner groove portion 34), and the remaining optical fiber 3 is guided to the outside of the partition portion 33 with the fiber groove 33C, and wound around the outer wall surface 33A of the partition portion 33. Thus, in the second embodiment, even in the state where the optical fiber 3 is wound around the outer wall surface 33A of the partition portion 33, the optical fiber 3 housed in the inside of the partition portion 33 can be pulled out.

Third Embodiment

Figure 23:
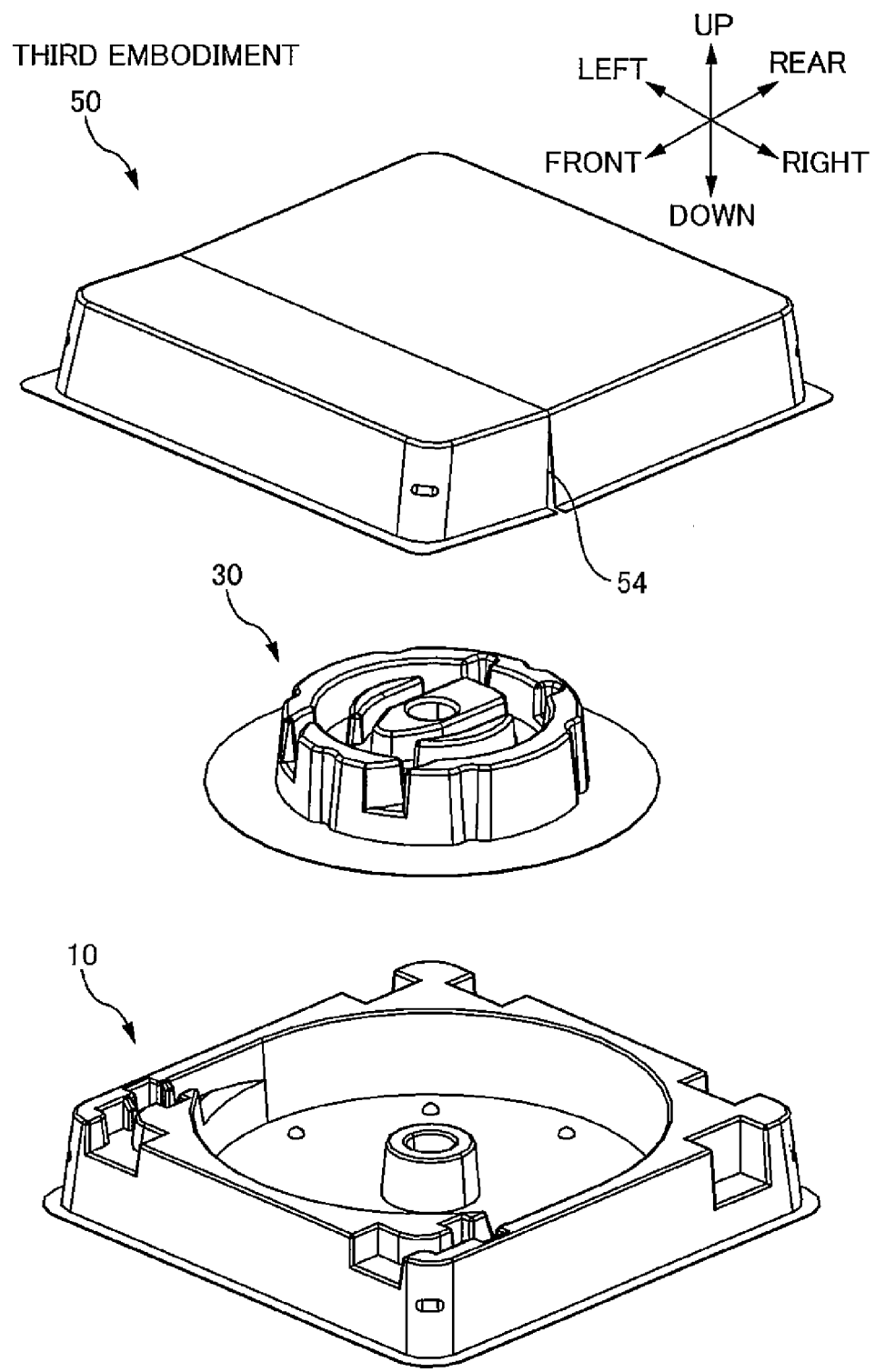
FIG. 23 is an explanatory view of the housing case 1 of a third embodiment.

FIG. 23 is an explanatory view of a housing case 1 of a third embodiment. It should be noted that, in the third embodiment, projecting portions 36 are not formed in a bobbin 30, and a recess 53 (protrusion 53) is not formed in an upper lid 50.

In the third embodiment, a slit 54 is formed in each of left and right side surfaces of the upper lid 50, and a front side section of the upper lid 50 can be opened. When the operator is pulling out from the bobbin 30 an optical fiber 3 housed in the housing case 1, the operator opens a front side section of the upper lid 50 in a state with the upper lid 50 covering the body 10 and the bobbin 30, takes out the connector 5 from the connector housing portion 13E, and pulls out the optical fiber 3.

In the third embodiment, since there is no rotation prevention mechanism of the bobbin 30, the optical fiber 3 can be pulled out with the upper lid 50 still covering the body 10 and the bobbin 30. In the case that the optical fiber 3 is pulled out with the upper lid 50 still covered, the optical fiber 3 wound around the bobbin 30 is not covered with an upper surface 51 of the upper lid 50, thus there is no possibility that the optical fiber 3 wound around the bobbin 30 will be entangled as shown in FIG. 20B. Thus, in the third embodiment, there does not have to be a mechanism to attach the turned over upper lid 50 to the bobbin 30.

By the way, in the first embodiment and the second embodiment described above, there is the rotation prevention mechanism to prevent the rotation of the bobbin 30, thus to pull out the optical fiber 3, the rotation prevention mechanism needs to be released, and there is a need to take the upper lid 50 off the body 10 and the bobbin 30. In this way, there is a possibility that the optical fiber 3 wound around the bobbin 30 will become entangled when the upper lid 50 is taken off (refer to FIG. 20B), thus in the first embodiment and the second embodiment described above, the turned over upper lid 50 is attached to the bobbin 30, and the optical fiber 3 wound around the bobbin 30 is covered from the upper side with the upper lid 50.

In the third embodiment, since there is no rotation prevention mechanism to prevent the rotation of the bobbin 30, there is a possibility that the bobbin 30 will rotate during storage of the housing case 1, and there is a possibility that the optical fiber 3 will be damaged. Further, in the third embodiment, since the turned over upper lid 50 cannot be attached to the bobbin 30, in the case that the upper lid 50 is removed, there is a possibility that the optical fiber 3 wound around the bobbin 30 may become entangled. Further, the slits 54 in the side surfaces of the upper lid 50 in the third embodiment cannot be formed during integral molding of plastic, thus the slits 54 need to be formed after molding, and time and cost is required in manufacturing of the upper lid 50.

It should be noted that, in the third embodiment, similar to the first embodiment and the second embodiment described above, during housing of the optical fiber 3, a one end side of the optical fiber 3 is housed in an inside of a partition portion 33 (in more detail an inner groove portion 34), and the remaining optical fiber 3 is guided to the outside of the partition portion 33 with a fiber groove 33C, and wound around an outer wall surface 33A of the partition portion 33. For this reason, in the third embodiment, even in the state where the optical fiber 3 is wound around the outer wall surface 33A of the partition portion 33, the optical fiber 3 housed in the inside of the partition portion 33 can be pulled out.

Fourth Embodiment

Figure 24:
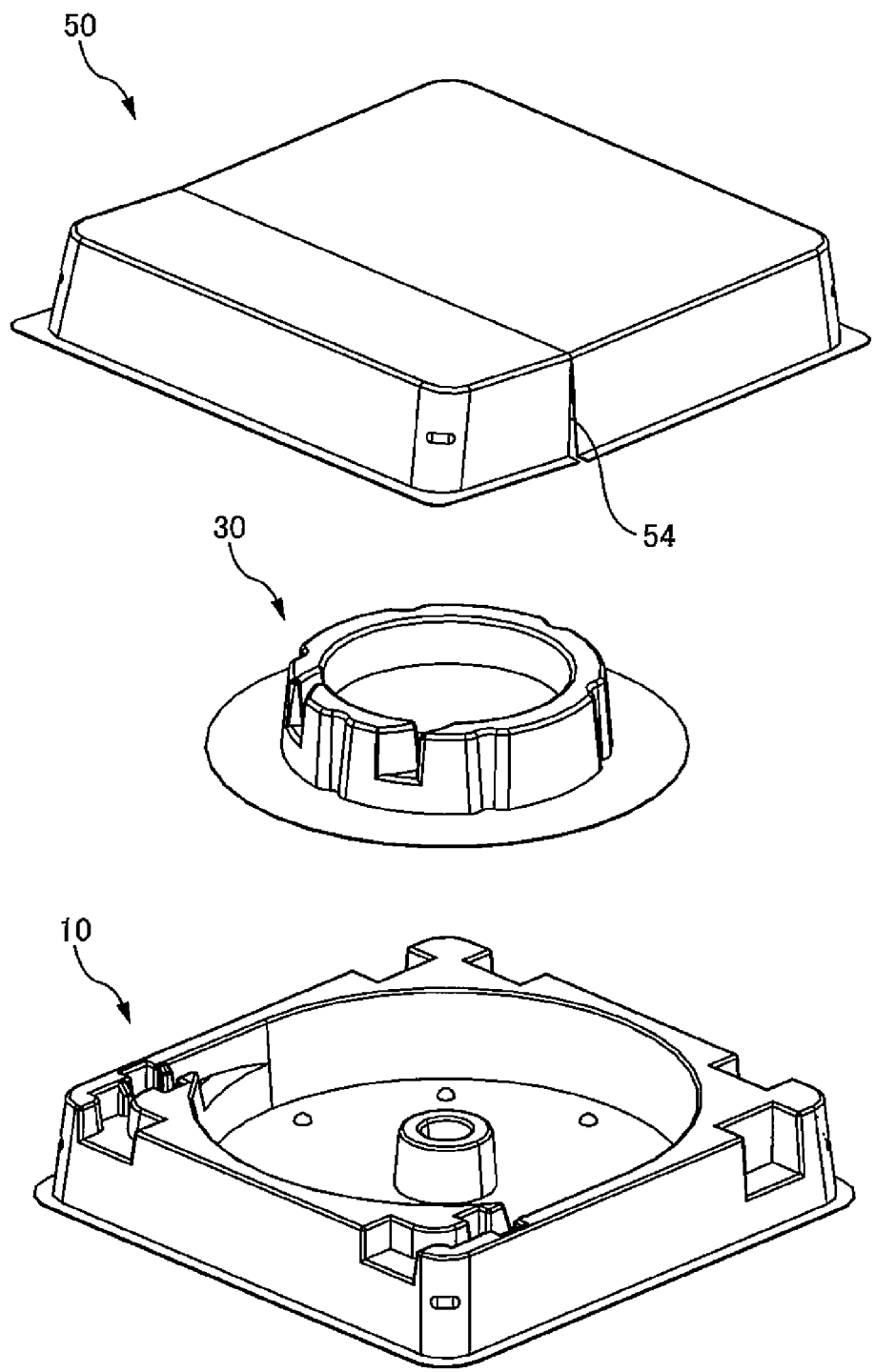
FIG. 24 is an explanatory view of the housing case 1 of a fourth embodiment.

FIG. 24 is an explanatory view of a housing case 1 of a fourth embodiment. It should be noted that, in the fourth embodiment, an inner groove portion 34 and protrusion portions 35 are not formed in the inside of a partition portion 33. Further, in the fourth embodiment, since there are no protrusion portions 35, a connector fixing portion 35B has not been formed.

In the fourth embodiment, similar to the first embodiment to the third embodiment described above, during housing of an optical fiber 3, a one end side of the optical fiber 3 is housed in an inside of a partition portion 33 (in more detail an inner groove portion 34), and the remaining optical fiber 3 is guided to an outside of the partition portion 33 with a fiber groove 33C, and wound around an outer wall surface 33A of the partition portion 33. For this reason, in the fourth embodiment, even in the state where the optical fiber 3 is wound around the outer wall surface 33A of the partition portion 33, the optical fiber 3 housed in the inside of the partition portion 33 can be pulled out.

In the fourth embodiment however, since there is no connector fixing portion 35B, when the connector 5 is housed in the inside of the partition portion 33, the connector 5 is not fixed, and the connector 5 easily moves. Further, in the fourth embodiment, since there is no annular inner groove portion 34, when the optical fiber 3 is housed in the inside of the partition portion 33, the optical fiber 3 easily moves.

Fifth Embodiment

Configuration of Housing Case

Figure 27:
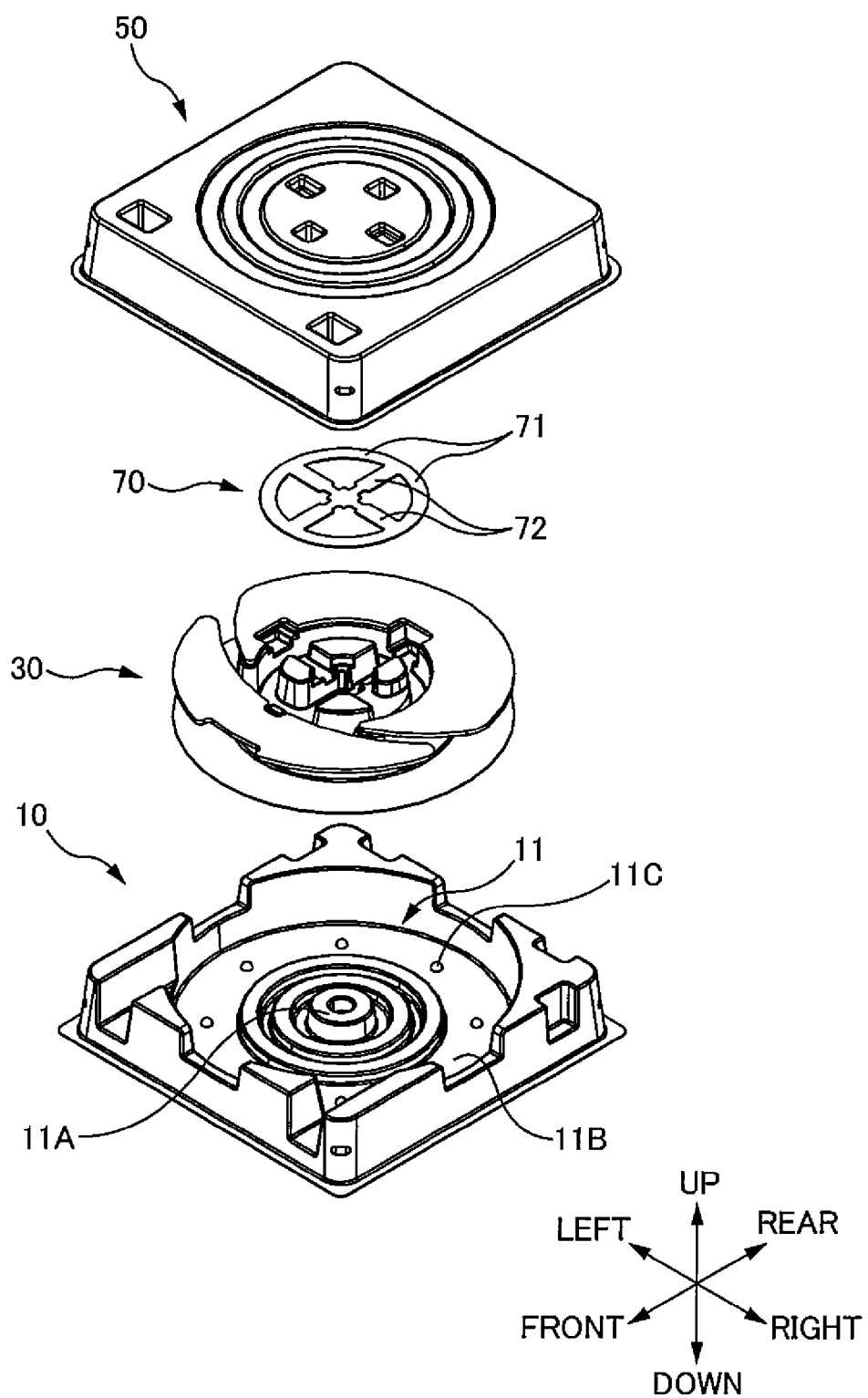
FIG. 27 is an exploded perspective view of a housing case of a fifth embodiment.

FIG. 27 is an exploded perspective view of a housing case of a fifth embodiment. The housing case of the fifth embodiment also has a body 10, a bobbin 30, and an upper lid 50. Members and sections having similar functions to the above described embodiments are assigned same reference numerals and descriptions thereof may be omitted. The housing case of the fifth embodiment further has a separation sheet 70. The housing case however, does not have to have the separation sheet 70.

Figure 28A:
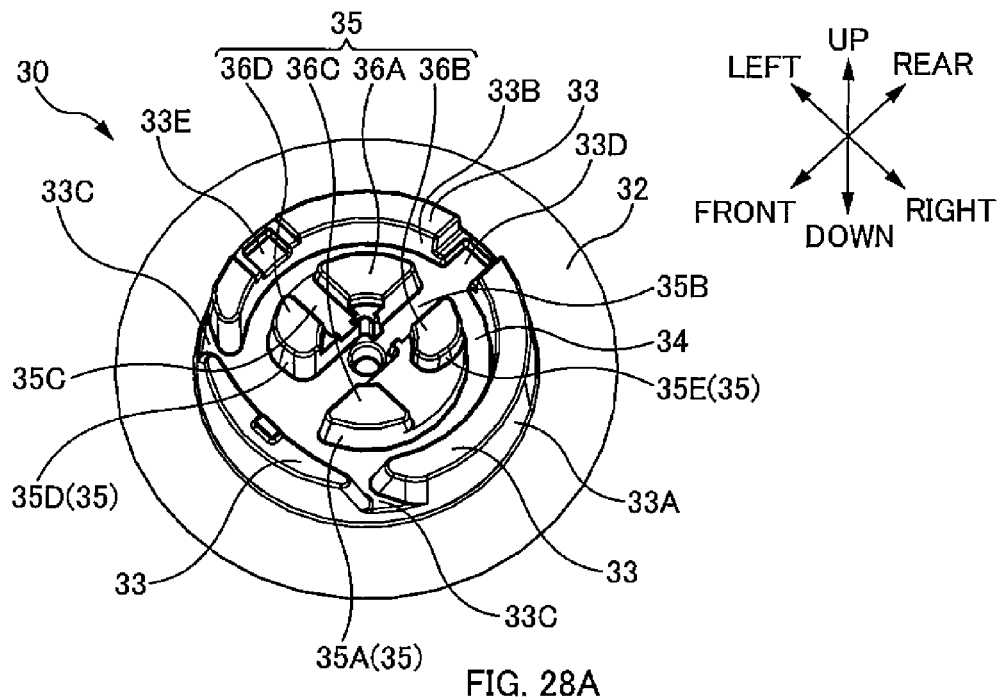
FIG. 28A to FIG. 28C are explanatory views of the bobbin 30 of the fifth embodiment.
Figure 28B:
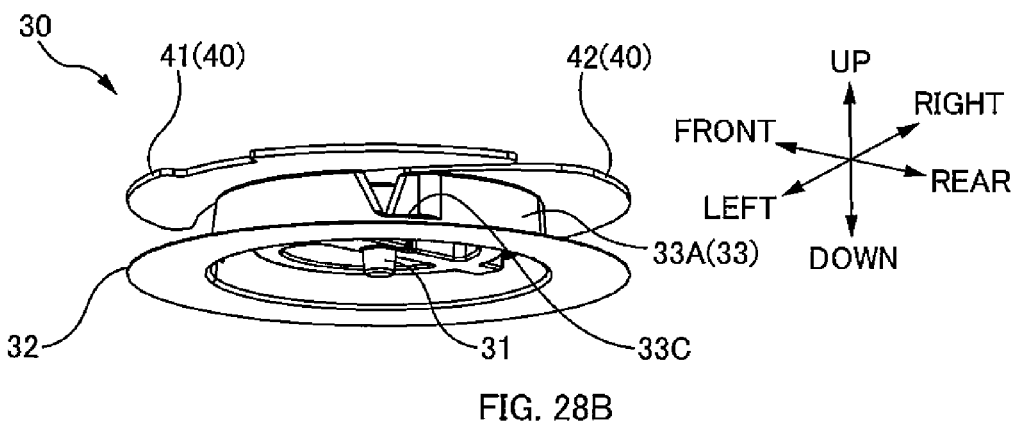
Figure 28C:
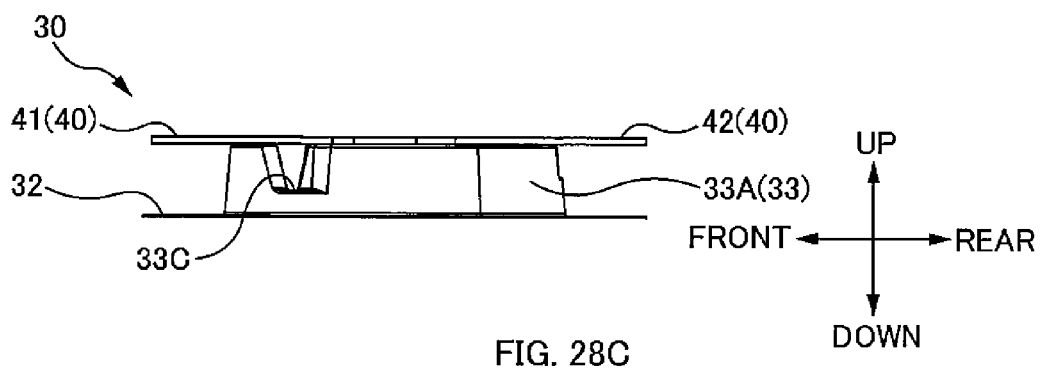

FIG. 28A to FIG. 28C are explanatory views of the bobbin 30 of the fifth embodiment. FIG. 28A is a perspective view seen from above right of the bobbin 30 with an upper flange member 40 taken off. FIG. 28B is a perspective view seen from below right of the bobbin 30. FIG. 28C is a side view seen from the right of the bobbin 30.

The upper flange member 40 of the bobbin 30 is a plate-like member that is to be adhered and fixed to the upper side of the bobbin 30, and by sandwiching the optical fiber 3 wound around the bobbin 30 with the flange portion 32 (a lower side flange portion), the member (an upper side flange portion) prevents the optical fiber 3 that is wound around from coming off from the upper side. The upper flange member 40 has a first upper flange member 41 and a second upper flange member 42, and there is a space between the first upper flange member 41 and the second upper flange member 42.

The partition portion 33 of the bobbin 30 is formed with two fiber grooves 33C, a first connector end fixing portion 33D, and a second connector end fixing portion 33E.

The fiber grooves 33C are grooves to guide the optical fiber 3 between the inside and the outside of the partition portion 33. In the upper side of the fiber grooves 33C, spaces with the first upper flange member 41 and the second upper flange member 42 are formed.

The first connector end fixing portion 33D and the second connector end fixing portion 33E are depressions to fix the end portion of the connector 5, and are formed in the inside of the partition portion 33. The first connector end fixing portion 33D is formed as the same depth as the inner groove portion 34. The second connector end fixing portion 33E is formed shallower than the inner groove portion 34. For this reason, the height of the connector 5 to be housed in the first connector end fixing portion 33D and the height of the connector 5 to be housed in the second connector end fixing portion 33E can be made different from each other.

The inner groove portion 34 of the bobbin 30 is wound around with approximately two to three meters of the optical fiber 3 at one end side of the optical fiber 3 that is approximately 100 meters to be housed in the housing case 1, and the optical fiber 3 that is approximately two to three meters at the other end side is also to be wound around thereon (to be described later).

The central portion of the protrusion portion 35 is formed with a cross-shaped groove (depression), and one groove becomes the first connector fixing portion 35B, and the other groove becomes the second connector fixing portion 35C.

The first connector fixing portion 35B and the second connector fixing portion 35C are grooves (depressions) to fix the connector 5. The first connector fixing portion 35B and the second connector fixing portion 35C are formed to not only house the connector body, but also to house a boot and a tab extending out from the connector body. It should be noted that, the boot is a section protecting the optical fiber 3, and is an elastic deforming portion that has flexibility. The tab is a section for pulling out the connector 5 from a socket (not shown) and is an elastic deforming portion having flexibility.

The first connector fixing portion 35B is formed with the same depth as the inner groove portion 34, similar to the first connector end fixing portion 33D. The first connector end fixing portion 33D of the partition portion 33 is positioned on an extension of the first connector fixing portion 35B, and the first connector fixing portion 35B and the first connector end fixing portion 33D are formed as the same depth. The end portion of the connector 5 housed in the first connector fixing portion 35B is to be fixed in the first connector end fixing portion 33D.

The second connector fixing portion 35C is formed shallower than the inner groove portion 34, similar to the second connector end fixing portion 33E. The second connector end fixing portion 33E of the partition portion 33 is positioned on an extension of the second connector fixing portion 35C, and the second connector fixing portion 35C and the second connector end fixing portion 33E are formed as the same depth. The end portion of the connector 5 to be housed in the second connector fixing portion 35C is to be fixed in the second connector end fixing portion 33E.

Thus, the first connector fixing portion 35B and the second connector fixing portion 35C are formed with different heights from each other. In other words, the groove that configures the first connector fixing portion 35B and the groove that configures the second connector fixing portion 35C are formed with different depths. Here, the first connector fixing portion 35B is formed in a lower position than the second connector fixing portion 35C. For this reason, the connector 5 fixed to the second connector fixing portion 35C is positioned to the upper side than the connector 5 to be fixed in the first connector fixing portion 35B.

The protrusion portion 35 is configured from four protruding portions protruding to the side of the upper lid 50. Of the four protruding portions, the left back side projecting portion 36A (the projecting portion near to both the first connector end fixing portion 33D and the second connector end fixing portion 33E) is referred to as a "first projecting portion 36A". The remaining three projecting portions may be referred to as a "second projecting portion 36B", a "third projecting portion 36C", and a "fourth projecting portion 36D", according to the clockwise direction order from the first projecting portion 36A. In other words, the second projecting portion 36B is the right back side projecting portion, and the third projecting portion 36C is the right front side projecting portion, and the fourth projecting portion 36D is the left front side projecting portion.

The first connector fixing portion 35B is to be configured in between the left side projecting portions (the first projecting portion 36A and the fourth projecting portion 36D) and the two right side projecting portions (the second projecting portion 36B and the third projecting portion 36C). Further, the second connector fixing portion 35C is to be configured between the front side projecting portions (the first projecting portion 36A and the second projecting portion 36B) and the back side projecting portions (the third projecting portion 36C and the fourth projecting portion 36D).

Figure 29A:
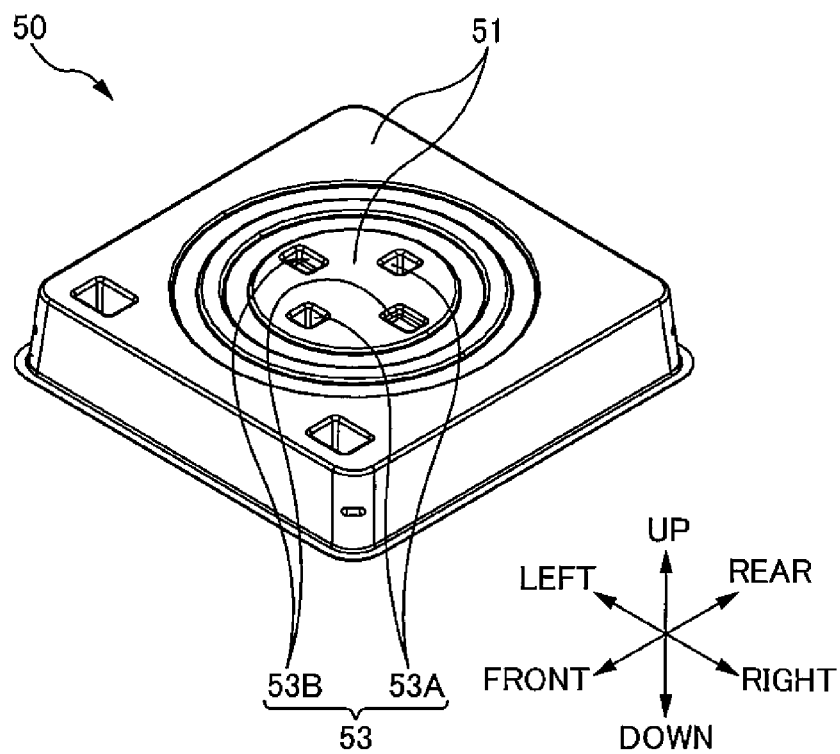
FIG. 29A is a perspective view of the upper lid 50 of the fifth embodiment seen from above right.
Figure 29B:
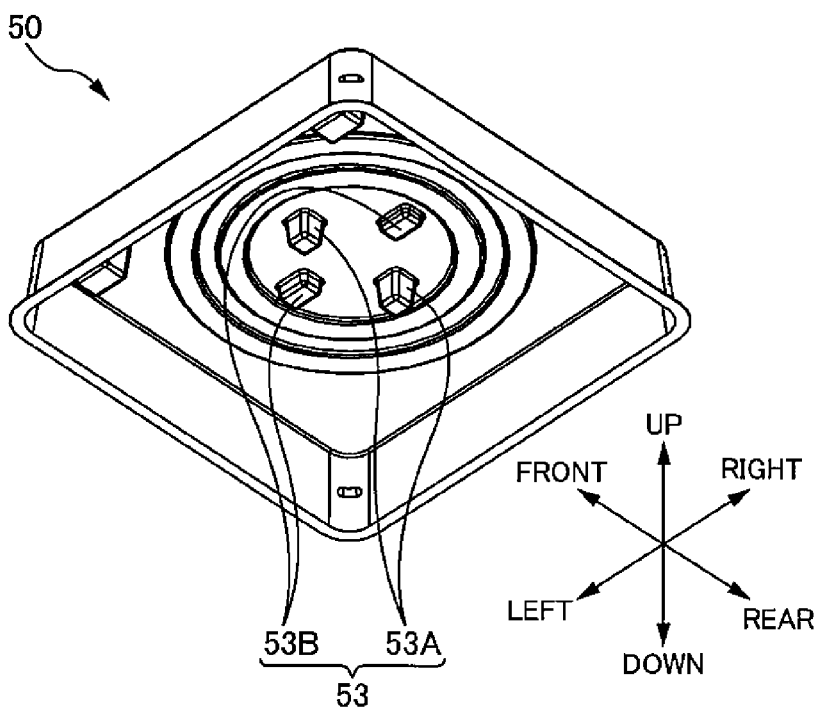
FIG. 29B is a perspective view of the upper lid 50 of the fifth embodiment seen from below right.

FIG. 29A is a perspective view seen from above right of the upper lid 50 in the fifth embodiment. FIG. 29B is a perspective view of the upper lid 50 in the fifth embodiment seen from below right.

In the central portion of the upper lid 50 are formed four recesses 53. The recesses 53 are protruding to the lower side from the upper surface 51 when seen from below the upper lid 50. In this way, the back side of the recesses 53 are made to be protrusions protruding toward the bobbin 30, thus the "recesses 53" are referred to as the "protrusions 53" in some cases. During storage of the housing case 1, the protrusions 53 are positioned to the upper side of the cross-shaped grooves (the first connector fixing portion 35B and the second connector fixing portion 35C) in the central portion of the bobbin 30. In the below description, the protrusions 53 positioned to the upper side of the first connector fixing portion 35B are referred to as "first protrusions 53A" and the protrusions 53 positioned to the upper side of the second connector fixing portion 35C are referred to as "second protrusions 53B" in some cases.

The first protrusions 53A protrude largely to the lower side than the second protrusions 53B. This is because the first connector fixing portion 35B is formed deeper than the second connector fixing portion 35C.

FIG. 27 shows the separation sheet 70. The separation sheet 70 is a sheet member arranged in the inside of the bobbin 30. The separation sheet 70 has an annular portion 71 and a cross portion 72.

The annular portion 71 is an annular section and is a section arranged in the inner groove portion 34 of the bobbin 30. After winding the one end side of the optical fiber 3 in the inside of the bobbin 30 and housing the optical fiber, at the time of winding around the other end side of the optical fiber 3 in the inside of the bobbin 30 and housing the optical fiber, the annular portion 71 separates the one end side and the other end side of the optical fiber 3 to the upper side and lower side.

The cross portion 72 is a cross-shaped section to the inside than the annular portion 71 and is a section arranged in the cross shaped groove (the first connector fixing portion 35B and the second connector fixing portion 35C) in the central portion of the bobbin 30. The cross portion 72 is arranged between two connectors 5 and separates the two connectors 5 to the upper side and the lower side.

<Optical Fiber Housing Method>

FIG. 30A to FIG. 30F are explanatory views of the manner of housing the optical fiber 3 in the housing case of the fifth embodiment.

Figure 30A:
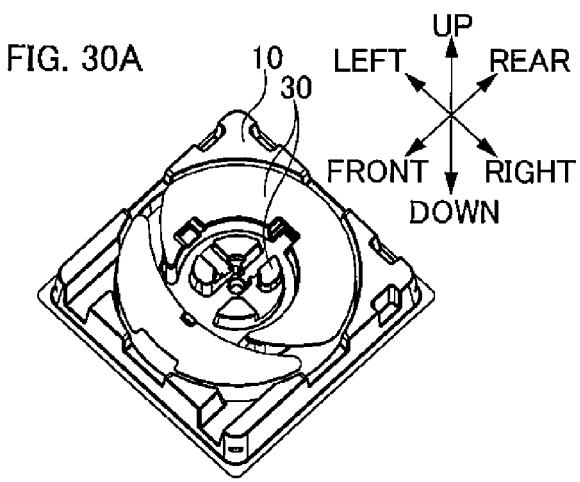
FIG. 30A to FIG. 30F are explanatory views of the manner of housing the optical fiber 3 in the housing case of the fifth embodiment.
Figure 30B:
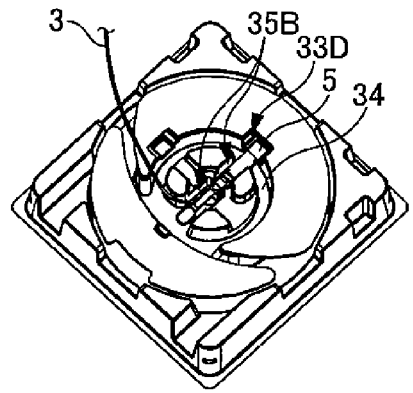
Figure 30C:
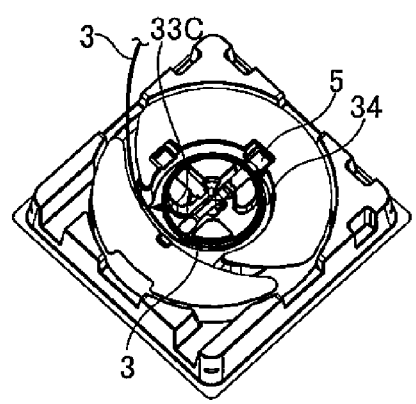

First, the operator houses the bobbin 30 in the bobbin housing portion 11 of the body 10 (refer to FIG. 30A). Next, the operator fixes the connector 5 to the first connector end fixing portion 33D and the first connector fixing portion 35B of the bobbin 30 (refer to FIG. 30B), winds approximately two to three meters of the optical fiber 3 gently around the inner groove portion 34 of the bobbin 30 (refer to FIG. 30C), and guides the optical fiber 3 from the inside to the outside of the partition portion 33 via the fiber groove 33C (refer to FIG. 30C).

Figure 30D:
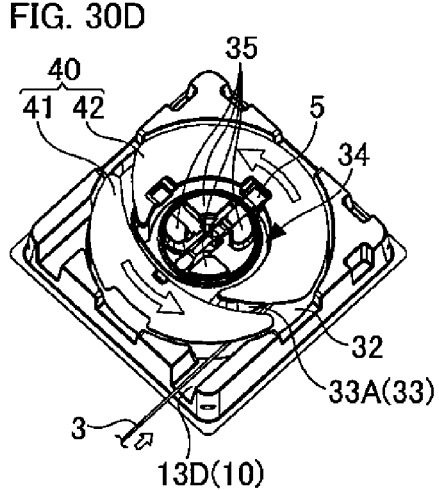

Next, the operator grasps the protrusion portions 35 of the bobbin 30 by hand, and here rotates the bobbin 30 anti-clockwise when seen from above (refer to FIG. 30D). When the bobbin 30 is rotated, the optical fiber 3 is wound around along the outer wall surface 33A of the partition portion 33. It should be noted that, the optical fiber 3 wound around the outer wall surface 33A is covered from above with the upper flange member 40. For this reason, the optical fiber 3 wound several times around the bobbin 30 can be prevented from going over above the bobbin 30 and coming off.

Figure 30E:
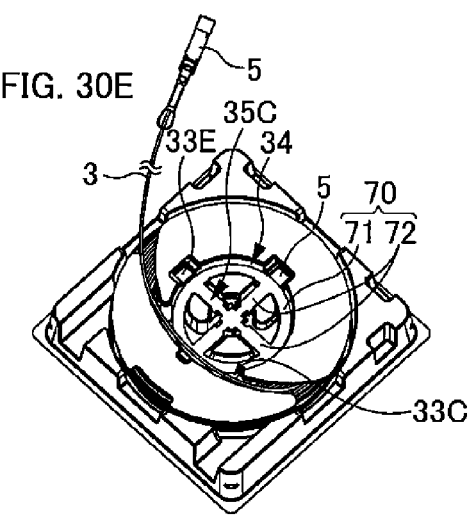

Next, the operator arranges the separation sheet 70 in the bobbin 30, and guides the optical fiber 3 from the outside to the inside of the partition portion 33 via the fiber groove 33C (refer to FIG. 30E). The fiber groove 33C that guides the optical fiber 3 to the inside of the partition portion 33 is a different one from the fiber groove 33C (refer to FIG. 30C) that guides the optical fiber 3 to the outside of the partition portion 33.

Figure 30F:
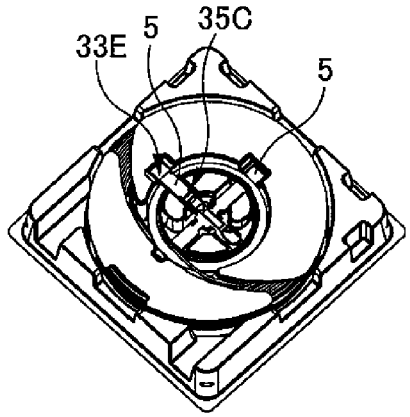

Next, the operator winds the remaining optical fiber 3 gently around the inner groove portion 34 of the bobbin 30 and houses the optical fiber, and fixes the connector 5 in the second connector end fixing portion 33E and the second connector fixing portion 35C of the bobbin 30 (refer to FIG. 30F). The separation sheet 70 is arranged in the bobbin 30, thus the remaining optical fiber 3 is housed above the annular portion 71 of the separation sheet 70. Thus, with the separation sheet 70, the one end side of the optical fiber 3 that has already been housed and the other end side of the optical fiber 3 that is to be housed at this time are to be separated to the upper side and the lower side. Further, since the second connector fixing portion 35C is formed shallower than the first connector fixing portion 35B, the connector 5 fixed in the second connector fixing portion 35C is positioned to the upper side than the connector 5 fixed in the first connector fixing portion 35B.

At this time, the second connector end fixing portion 33E is formed in the partition portion 33, and the second connector fixing portion 35C is formed in the protrusion portion 35, thus when the connector 5 is fixed in the second connector end fixing portion 33E and the second connector fixing portion 35C, the connector 5 is arranged to stride over the inner groove portion 34. In addition, the second connector end fixing portion 33E and the second connector fixing portion 35C are formed shallower than the inner groove portion 34, thus the connector 5 is arranged to stride over above the optical fiber 3 housed in the inner groove portion 34 (the optical fiber 3 that extends out from the connector 5 fixed in the first connector fixing portion 35B) (also refer to FIG. 12B). For this reason, when the connector 5 is fixed in the second connector end fixing portion 33E and the second connector fixing portion 35C, it becomes difficult for the optical fiber 3 housed in the inner groove portion 34 to come off.

Finally, the operator covers the upper lid 50 from above the body 10 and the bobbin 30, and completes the housing work of the optical fiber 3.

<During Inspection>

Figure 31A:
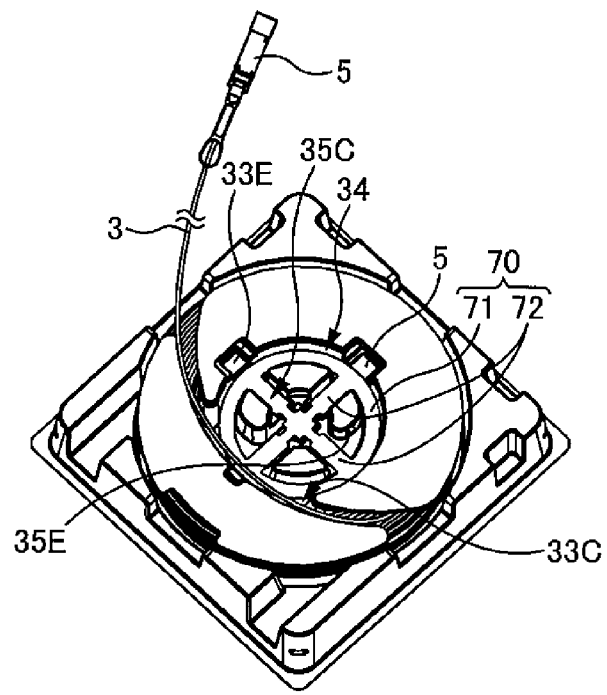
FIG. 31A and FIG. 31B are explanatory views during inspection of the optical fiber 3 (or the connector 5).
Figure 31B:
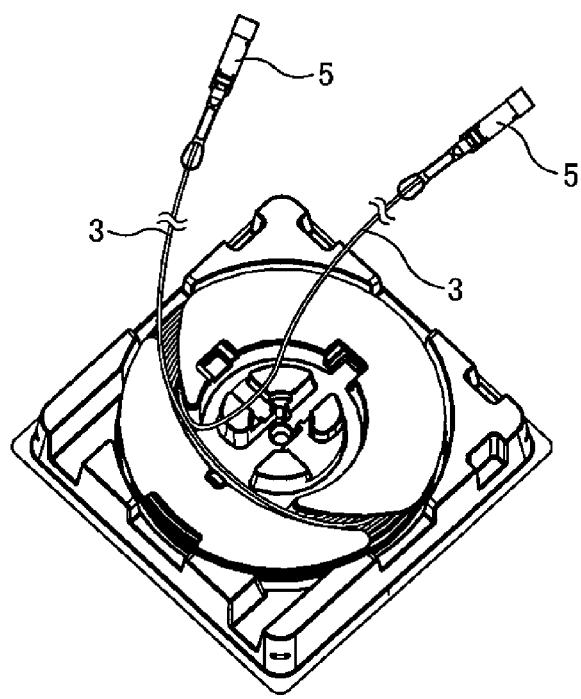

FIG. 31A and FIG. 31B are explanatory views during inspection of the optical fiber 3 (or the connector 5).

First, as shown in FIG. 31A, the operator takes out from the bobbin 30 the connector 5 fixed in the second connector fixing portion 35C and the optical fiber 3 wound around the inner groove portion 34 above the separation sheet 70 (the optical fiber 3 to the side of the connector 5 in the second connector fixing portion 35C).

In the fifth embodiment, the connector 5 fixed in the second connector fixing portion 35C is positioned to the upper side than the connector 5 fixed in the first connector fixing portion 35B, thus the structure is such that it is difficult to take out the connector 5 in the first connector fixing portion 35B before the connector 5 in the second connector fixing portion 35C. In addition, in the fifth embodiment, the connector 5 in the first connector fixing portion 35B is positioned to the lower side of the separation sheet 70, thus the structure is such that it is difficult to take out the connector 5 in the first connector fixing portion 35B before. Thus, the operator can determine which of the two connectors 5 fixed in the inside of the partition portion 33 of the bobbin 30 should be taken out before.

Further, in the fifth embodiment, the one end side and the other end side of the optical fiber 3 are separated to the upper side and the lower side with the separation sheet 70. Thus, when the optical fiber 3 is taken out with the connector 5 in the second connector fixing portion 35C, the optical fiber does not get entangled with the optical fiber 3 at the end portion of the opposite side (the optical fiber 3 housed in the lower side of the separation sheet 70).

Next, as shown in FIG. 31B, the operator takes out the connector 5 fixed to the first connector fixing portion 35B and the optical fiber 3 wound around the inner groove portion 34 (the optical fiber 3 to the side of the connector 5 in the first connector fixing portion 35B). Then, the operator uses the two connectors 5 taken out from the housing case 1 and performs a predetermined inspection.

Also in the fifth embodiment, the optical fiber 3 that is approximately two to three meters to the connector 5 side of the first connector fixing portion 35B is housed in the inside of the partition portion 33 (in detail the inner groove portion 34). For this reason, even if most of the remaining part of the optical fiber 3 is in a state wound around the outer wall surface 33A of the partition portion 33, the optical fiber 3 can be pulled out with the connector 5 in the first connector fixing portion 35B. Thus, inspection and the like of the optical fiber 3 and the connectors 5 become easy.

Other Points

The above embodiments describe mainly in regards to the housing case, but it is needless to say that the above description includes disclosures of the housing method, the storage method, and the setting method of the optical fiber, and also the manufacturing method and the usage method and the like of the housing case.

The above embodiments are to facilitate understanding of the invention, and do not limit understanding of the invention in any way. This invention may be altered and modified without departing from the spirit thereof, and it is needless to say that this invention includes its equivalents.

<Regarding Housing Case>

With the above described housing case, the body 10 and the upper lid 50 have been formed in a quadrilateral shape when seen from above, and thus is a quadrilateral shape when seen from above. The housing case however, is not limited to such a shape.

Figure 25:
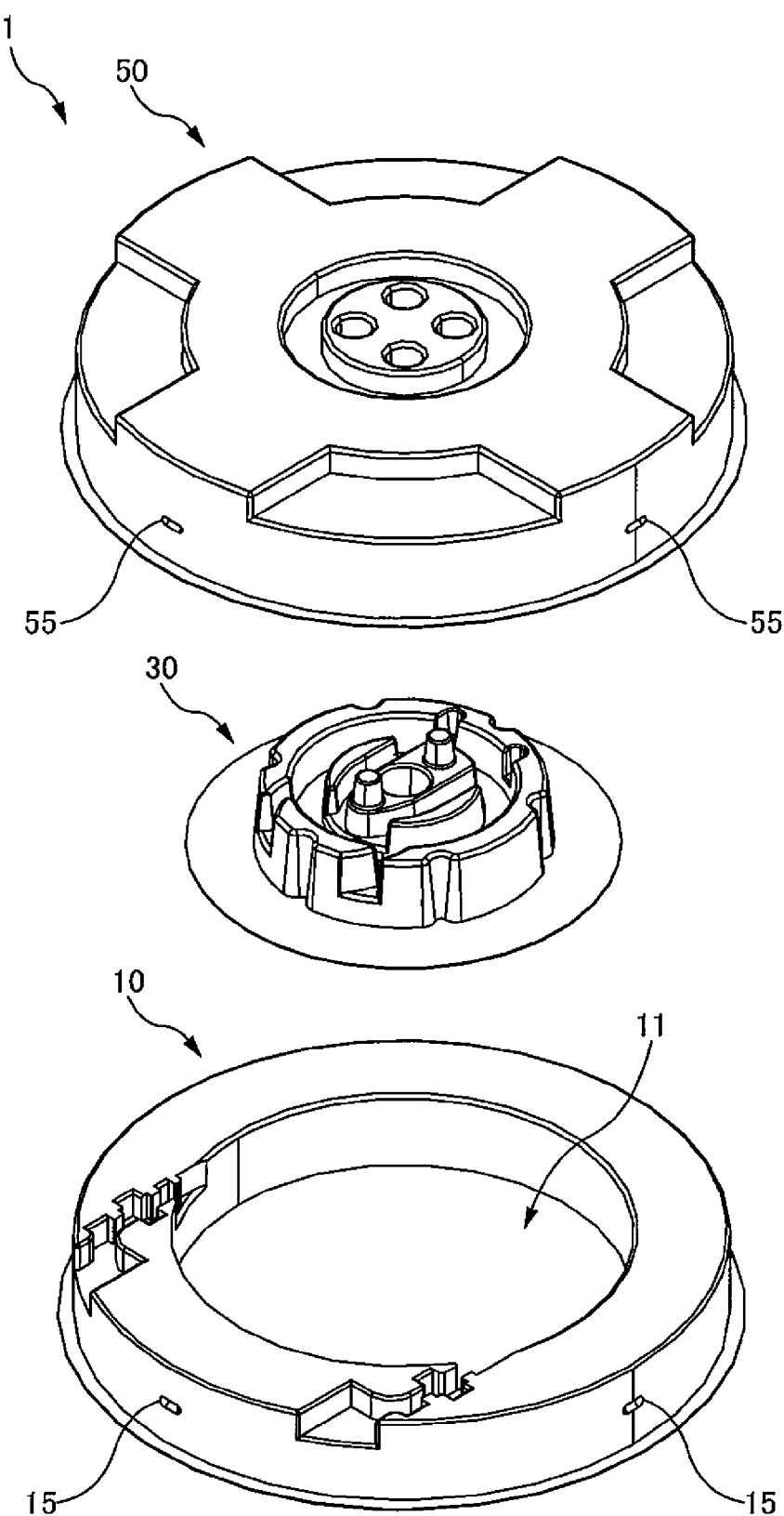
FIG. 25 is an explanatory view of a different housing case 1.

FIG. 25 is an explanatory view of a different housing case 1. In this way, the housing case 1 may be a circular shape when seen from above. In this case, the outer surface 13B of the body 10 and the inner surface of the upper lid 50 are cylindrical surfaces, and there is a possibility that the upper lid 50 will rotate with respect to the body 10 during storage of the housing case 1. Thus, it is preferable to provide a rotation prevention mechanism to prevent the rotation of the upper lid 50 with respect to the body 10. Here, as the rotation prevention mechanism, recesses 15 are formed in the body 10, and recesses 55 are formed in the upper lid 50. By the protrusions (not shown) on the back side of the recesses 55 in the upper lid 50 fitting into the recesses 15 of the body 10, the rotation of the upper lid 50 with respect to the body 10 is prevented. It should be noted that, the rotation prevention mechanism to prevent the rotation of the upper lid 50 with respect to the body 10 may be other configurations.

With the housing case 1 in FIG. 25, since the upper lid 50 is a circular shape when seen from above, there is an advantage that the work space during pulling out of the fiber (during attaching the turned over upper lid 50 to the bobbin 30) can be approximately the same area as the installing space of the housing case 1. On the contrary, in the case where the upper lid 50 is a quadrilateral shape when seen from above, the four corners of the upper lid 50 protrude to the outside than the installing space as shown in FIG. 20A, thus a larger work space than the installing space is necessary.

<Regarding Optical Fibers>

The above described housing case houses the optical fiber, but the housing case may house optical cords and optical cables including the optical fiber. Further, the housing case may house a composite cable of an optical fiber and a metal cable. Further, the optical fiber to be housed in the housing case may be single core or multicore.

<Regarding Connectors>

The above described connector is an optical module integrated with photoelectric conversion elements (a light-emitting element or a light-receiving element), and is a connector that connects the electric signal lines together by converting optical signals to electric signals. It is not limited to such connectors however, and for example, the connectors may be connectors (optical connectors) that optically connect the optical fibers together.

<Regarding Partition Portion>

The above described partition portion is a cylindrical shape, but it is not limited to this shape. The partition portion may be a different shape, for example, an oval cylindrical shape, as long as the partition portion is a shape in which the allowable radius of curvature of the optical fiber can be maintained when the optical fiber is housed therein.

REFERENCE SIGNS LIST 1 housing case, 3 optical fiber, 5 connector,
10 body, 11 bobbin housing portion,
11A shaft supporting portion, 11B bottom surface,
11C protruded contact point,
13 edge portion, 13A inner surface, 13B outer surface,
13C reinforcing rib, 13D fiber passage groove,
13E connector storage portion, 13F edge bottom portion,
15 recess, 30 bobbin, 31 rotation shaft, 32 flange portion,
33 partition portion, 33A outer wall surface,
33B inner wall surface, 33C fiber groove,
33D connector end fixing portion (first connector end fixing portion),
33E second connector end fixing portion,
34 inner groove portion, 35 protrusion portion,
35A peripheral surface,
35B connector fixing portion (first connector fixing portion),
35C second connector fixing portion,
36 projecting portion,
36A-36D first projecting portion—fourth projecting portion,
50 upper lid, 51 upper surface,
52 annular recess (annular projection),
53 recess (protrusion), 54 slit, 55 protrusion

The invention claimed is:
1. A housing case comprising:
a body; and
a bobbin around which an optical fiber is to be wound, the bobbin being housed rotatably in the body, the bobbin having a partition portion, the partition portion having a fiber groove that guides the optical fiber between an inside and an outside of the partition portion, and the optical fiber being housed by housing a one end side of the optical fiber in the inside of the partition portion and by winding around an outer wall surface of the partition portion the optical fiber that has been guided to the outside of the partition portion with the fiber groove.

2. A housing case according to claim 1, wherein an annular inner groove portion is formed in the inside of the partition portion.

3. A housing case according to claim 2, wherein a protrusion portion is formed in an inside of the inner groove portion, and the protrusion portion has a connector fixing portion that fixes a connector provided to the one end side of the optical fiber.

4. A housing case according to claim 3, wherein the partition portion has a connector end fixing portion that fixes an end portion of the connector.

5. A housing case according to claim 4, wherein the connector end fixing portion and the connector fixing portion are formed shallower than the inner groove portion.

6. A housing case according to claim 4, further comprising an upper lid to cover the body, the bobbin, and the optical fiber wound around the bobbin, the upper lid having an annular projection formed opposing the inner groove portion, and the annular projection being arranged to an upper side of the connector.

7. A housing case according to claim 1, wherein the partition portion has two fiber grooves, the one end side of the optical fiber is housed in the inside of the partition portion, and the optical fiber is guided to the outside of the partition portion with one of the fiber grooves, and another end side of the optical fiber is guided to the inside of the partition portion with another fiber groove, and the optical fiber is housed in the inside of the partition portion.

* * * * *